United States Patent
Ahn et al.

(10) Patent No.: US 11,438,742 B2
(45) Date of Patent: Sep. 6, 2022

(54) METHOD AND APPARATUS FOR VEHICLE-TO-VEHICLE MESSAGE SERVICE

(71) Applicant: SK TELECOM CO., LTD., Seoul (KR)

(72) Inventors: Hongbeom Ahn, Seoul (KR); Sang Shin Lee, Seoul (KR); Young Lak Kim, Seoul (KR); Sungmin Baek, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 231 days.

(21) Appl. No.: 16/863,084

(22) Filed: Apr. 30, 2020

(65) Prior Publication Data
US 2020/0260239 A1    Aug. 13, 2020

Related U.S. Application Data

(63) Continuation of application No. PCT/KR2018/007121, filed on Jun. 22, 2018.

(30) Foreign Application Priority Data

Oct. 30, 2017  (KR) .................. 10-2017-0142339
Jun. 21, 2018  (KR) .................. 10-2018-0071682

(51) Int. Cl.
*H04W 4/46*    (2018.01)
*H04W 4/021*   (2018.01)
(Continued)

(52) U.S. Cl.
CPC ............ *H04W 4/46* (2018.02); *G08G 1/0116* (2013.01); *G08G 1/162* (2013.01); *H04W 4/021* (2013.01); *H04W 4/12* (2013.01); *H04W 8/18* (2013.01)

(58) Field of Classification Search
CPC ..................................................... H04W 4/46
See application file for complete search history.

(56) References Cited

U.S. PATENT DOCUMENTS

2014/0330453 A1* 11/2014 Nakagawa ............ B60L 53/305
                                                       701/2
2015/0023668 A1*  1/2015 Spaulding .............. G08G 1/163
                                                      398/118
(Continued)

FOREIGN PATENT DOCUMENTS

JP    2003-223696 A     8/2003
KR    10-0600678 B1     7/2006
(Continued)

OTHER PUBLICATIONS

International Search Report dated Sep. 28, 2018, in connection with counterpart International Patent Application No. PCT/KR2018/007121, citing the above references with English translation.

*Primary Examiner* — Joseph H Feild
*Assistant Examiner* — Pameshanand Mahase
(74) *Attorney, Agent, or Firm* — Hauptman Ham, LLP

(57) ABSTRACT

A method and an apparatus for vehicle-to-vehicle or V2V message service are disclosed. In at least one aspect, a method of operating a V2V message service apparatus in a V2V communication system includes when a first vehicle equipped with the V2V message service apparatus enters a particular road link, subscribing the first vehicle to a V2V message server with the particular road link as a topic, and receiving an event message including an event-situated road link as a topic from the V2V message server, and determining whether to issue an alarm corresponding to the event message based on a preceding and trailing relationship between the first vehicle and a second vehicle that published the event message.

19 Claims, 15 Drawing Sheets

(51) Int. Cl.
*H04W 4/12* (2009.01)
*H04W 8/18* (2009.01)
*G08G 1/01* (2006.01)
*G08G 1/16* (2006.01)

(56) References Cited

U.S. PATENT DOCUMENTS

| | | | | |
|---|---|---|---|---|
| 2016/0146619 | A1* | 5/2016 | Song | H04W 4/046 |
| | | | | 701/537 |
| 2017/0330457 | A1* | 11/2017 | Bhalla | G08G 1/096783 |
| 2019/0130739 | A1* | 5/2019 | Khedkar | G08G 1/0965 |

FOREIGN PATENT DOCUMENTS

| | | |
|---|---|---|
| KR | 10-2013-0143185 A | 12/2013 |
| KR | 10-2016-0063047 A | 6/2016 |
| KR | 10-2017-0099701 A | 9/2017 |

* cited by examiner

METHOD AND APPARATUS FOR VEHICLE-TO-VEHICLE MESSAGE SERVICE

RELATED APPLICATION

This application is a continuation of International Application No. PCT/KR2018/007121, filed Jun. 22, 2018, which is based upon and claims the benefit of priority from Korean Patent Application No. 10-2017-0142339 filed on Oct. 30, 2017 and Korean Patent Application No. 10-2018-0071682 filed on Jun. 21, 2018. The disclosures of the above listed applications are hereby incorporated by reference herein in their entireties.

TECHNICAL FIELD

The present disclosure in some embodiments relates to a message service method and a message service apparatus for transmitting and obtaining event information between vehicles.

BACKGROUND

The statements in this section merely provide background information related to the present disclosure and do not necessarily constitute prior art.

With the development of an Intelligent Transportation System (ITS), methods are being researched for exchanging various information, such as real-time traffic information and safety warning, between vehicles. One of the key technologies for implementing such exchanges is vehicle-to-vehicle or V2V communication.

V2V communication provides a more secure traffic environment to a driver through V2V message exchange that satisfies low latency communication criteria in a high speed mobile environment. In addition, the purpose of the V2V communication is to provide various traffic services, thereby providing efficiency and convenience of the vehicle operation.

To smoothly provide various services based on V2V communication requires low latency transmission of service-related information, and it is necessary to check the preceding and trailing relationship of vehicles and whether driving is co-directional in order to deliver accurate service needs. Therefore, V2V communication needs a technology that can deliver V2V messages to a specific vehicle according to a service purpose with optimal delay.

However, the existing V2V communication devotedly concentrated its research endeavors on a direct communication technology between vehicles, and to accurately implement V2V communication services for an intended purpose requires a dedicated system to be introduced to analyze the preceding and trailing relationship of vehicles and driving directions. With the existing art of V2V communication, it is difficult to achieve both low latency requirements and exact service provision.

SUMMARY

Technical Problem

The present disclosure in some embodiments seeks to provide a method and an apparatus for providing a message service between vehicles, capable of improving traffic safety and driving convenience of a driver by transmitting a V2V message with a low latency to well-targeted vehicles suitable for the service purpose.

Technical Solution

At least one aspect of the present disclosure provides a method of operating a V2V message service apparatus in a V2V communication system, including when a first vehicle equipped with the V2V message service apparatus enters a particular road link, subscribing the first vehicle to a V2V message server with the particular road link as a topic, and receiving an event message including an event-situated road link as a topic from the V2V message server, and determining whether to issue an alarm corresponding to the event message based on a preceding and trailing relationship between the first vehicle and a second vehicle that published the event message.

Another aspect of the present disclosure provides a computer program stored in a non-transitory computer readable medium and a including computer-executable instructions for causing, when executed in a processor, the processor to perform a method of operating a V2V message service apparatus in a V2V communication system, including when a first vehicle equipped with the V2V message service apparatus enters a particular road link, subscribing the first vehicle to a V2V message server with the particular road link as a topic, and receiving an event message including an event-situated road link as a topic from the V2V message server, and making a determination of a preceding and trailing relationship between the first vehicle and a second vehicle that published the event message, and determining whether to issue an alarm corresponding to the event message based on the determination made on the preceding and trailing relationship.

Yet another aspect of the present disclosure provides a method of operating a V2V message server in a V2V communication system including in response to a subscription request signal received from a first vehicle entering a particular road link, having the first vehicle subscribe to a subscriber group with respect to the particular road link, and receiving an event message including an event-situated road link as a topic from a second vehicle remaining in the event-situated road link, and making a determination of a preceding and trailing relationship between the first vehicle and a second vehicle, and determining, based on the determination made on the preceding and trailing relationship, whether to issue an alarm in the first vehicle, corresponding to the event message, wherein a location of the first vehicle belongs to a preset message propagation range from a location of the second vehicle, and distributing the event message received along with information on the determination made on whether to issue the alarm to the first vehicle.

Yet another aspect of the present disclosure provides a method of operating a V2V message server in a V2V communication system to detect an off-normal vehicle including upon determining that a vehicle which entered a particular road link remains in the particular road link at or after a preset vehicle passing time, determining whether the vehicle is off-normal based on whether or not a keepalive message of the vehicle is obtained, and issuing an off-normal vehicle notification when the vehicle is off-normal, the issuing includes registering the particular road link where the vehicle remains as an off-normal vehicle dwell segment and determining a notification of an off-normal segment message for the off-normal vehicle dwell segment.

Yet another aspect of the present disclosure provides a V2V message server including a communication unit, an off-normal vehicle determination unit, and an off-normal vehicle notification unit. The communication unit is configured to communicate with at least one vehicle equipped with a V2V message service apparatus. The off-normal vehicle determination unit is configured to be responsive to a determination that a vehicle which entered a particular road link remains in the particular road link at or after a preset vehicle passing time for checking whether the vehicle is off-normal based on whether or not a keepalive message of the vehicle is obtained. The off-normal vehicle notification unit is configured to issue an off-normal vehicle notification when the vehicle is off-normal through registering the particular road link where the vehicle remains as an off-normal vehicle dwell segment and determining a notification of an off-normal segment message for the off-normal vehicle dwell segment.

DETAILED DESCRIPTION

Figure 1:
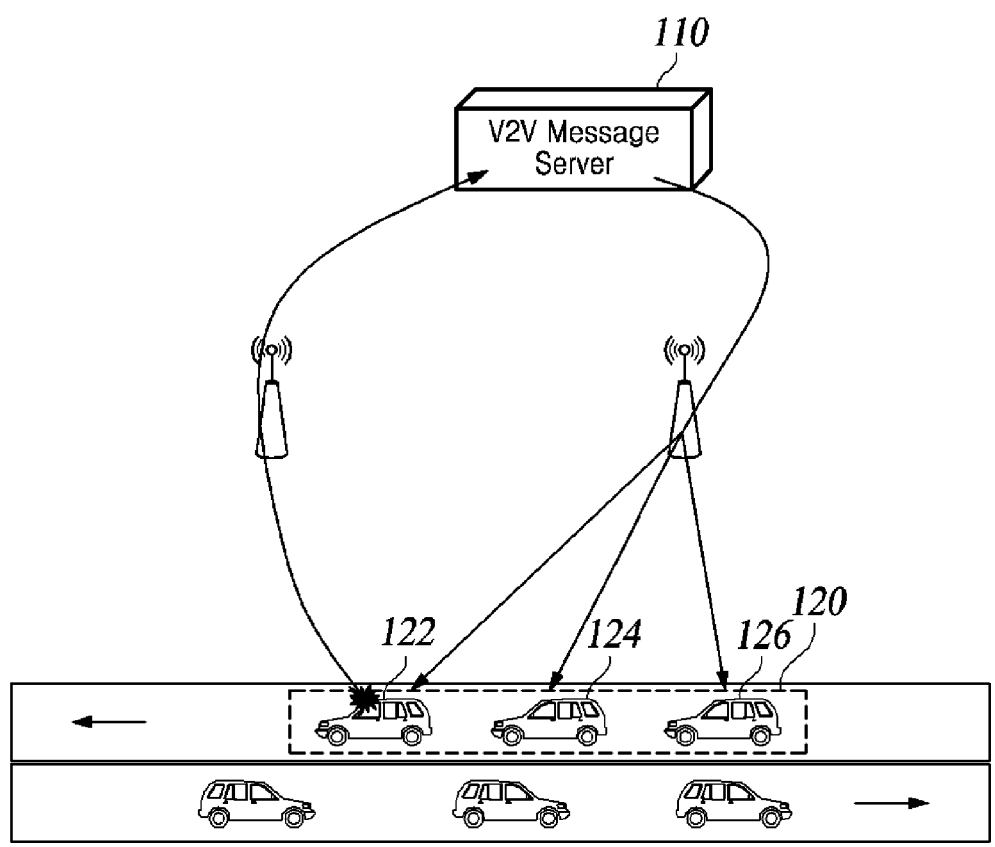
FIG. 1 is a conceptual diagram of a V2V message service system according to at least one embodiment of the present disclosure.

Hereinafter, some embodiments of the present disclosure will be described in detail with reference to the accompanying drawings. In describing the present disclosure, the terms such as "unit," "module," and the like refer to one or more units for processing at least one function or operation, which may be implemented by hardware, software, or a combination thereof.

V2V communication enables the realization of a system for providing information related to a traffic situation in real time by collecting and processing driving information of individual vehicles in real time and transmitting the collected driving information to an adjacent vehicle or a center. At this time, it is preferable to use a multicast scheme in order to transmit the driving information of the individual vehicles in real time. Briefly described, a multicast scheme generates a logical group to enable members to join/leave the group, and transfer a message to the group by transmitting a message to the group and eventually to the members who joined that group.

A method of transferring a message between vehicles according to this multicast scheme is as follows. The first step is to generate a logical group by making members of vehicles to exchange messages and to transmit a message to that group. The message delivered to the group is transmitted to all vehicles belonging to the group. However, in practice an Internet protocol (IP) network environment makes it difficult to utilize such a multicast scheme. In order to utilize the IP multicast scheme, a particular segment router for performing IP communication needs to be installed with a function for multicast, when the current IP network environment involves a significant number of routers that do not have a multicast function.

Therefore, the present disclosure provides a V2V message service method and apparatus capable of providing such an effect as good as an IP multicast scheme on an IP network without using an actual IP multicast scheme. Particularly, the present disclosure transmits a V2V message in real time based on a publish-subscribe communication scheme.

The publish-subscribe communication scheme works as follows. One or more subscribers interested in a particular topic subscribe for the topic. Here, to subscribe for a topic means registering with a server that one has an intention to receive a message about the topic which the one subscribes for. The message published by its publisher as the relevant topic is delivered to one or more subscribers who subscribe for that topic.

When compared with the publish-subscribe communication scheme, the IP multicast scheme may have its logical group correspond to the topic of the publish-subscribe communication scheme. In addition, the multicast join and multicast leave operations in IP-based multicast correspond respectively to subscribe and unsubscribe operations of the publish-subscribe communication scheme. On the other hand, in the IP multicast scheme, when a message sender performs a message transmission to its known multicast IP addresses, recipients subscribed to those IP addresses receive the message, wherein the multicast IP addresses correspond to a topic and the message transmission corresponds to a publish operation.

The following will describe in detail a method and an apparatus for providing a V2V message service according to some embodiments of the present disclosure using a publish-subscribe communication scheme capable of providing an effect analogous to the IP-based multicast technique.

FIG. 1 is a conceptual diagram of a V2V message service system according to at least one embodiment of the present disclosure.

A V2V message server 110 is provided as a server in which the publish-subscribe communication function is implemented, and it distributes a V2V message based on topics of V2V messages, to vehicles subscribed for those respective topics. Here, the topic is set to a particular road link. The road link refers to a single road segment exhibiting a traffic flow in one direction, and each road link is provided with an identifier.

As shown in FIG. 1, vehicles 122, 124, and 126 traveling in the same direction on the same road link may subscribe to the V2V message server 110 with the same road link set as topic. The vehicles 122, 124, 126 subscribed to the V2V message server 110 with that road link set as topic may be tied to one subscriber group 120, and a message published by a particular vehicle 122 belonging to the subscriber group 120 is transmitted through the V2V message server 110 to the vehicles 122, 124, 126 in the same group.

The V2V message service may be performed by a V2V message service apparatus included in each vehicle.

Figure 2:
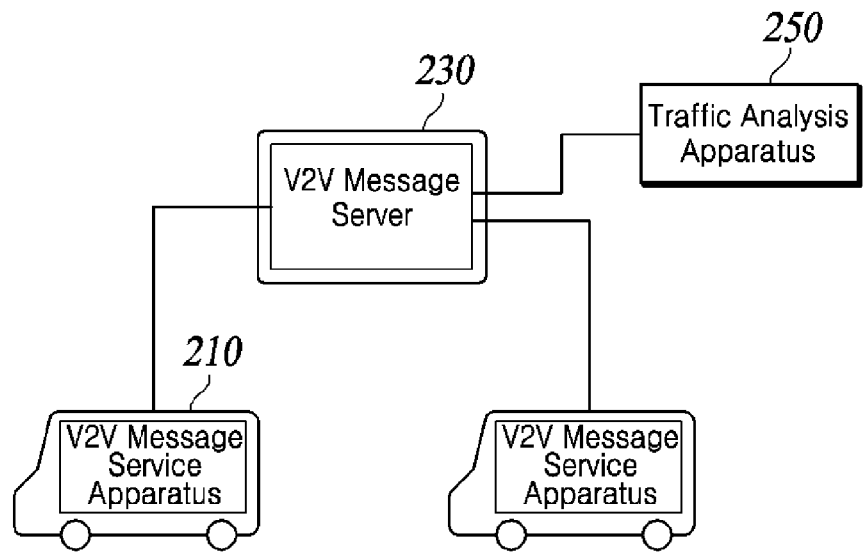
FIG. 2 is a block diagram of a configuration of a V2V message service system according to at least one embodiment of the present disclosure.

FIG. 2 is a block diagram of a configuration of a V2V message service system according to at least one embodiment of the present disclosure.

As shown in FIG. 2, the V2V message service system may include at least one V2V message service apparatus 210 and a V2V message server 230. In addition, the V2V message service system may further include a traffic analysis apparatus 250.

The V2V message service apparatus 210 refers to software or hardware installed in an apparatus mounted or provided in a vehicle, such as a navigation apparatus, a smart phone, or the like. Here, the V2V message service apparatus 210 may be implemented as a software stack for providing various services, and is preferably present in a navigation apparatus.

The V2V message service apparatus 210 maps vehicle location information obtained through a GPS module or the like to road link information or applies a technique such as a dead reckoning, a hybrid algorithm, etc. to detect entry or departure to or from a particular road segment. Through these methods, the V2V message service apparatus 210 can check a particular road link which the vehicle entered and is traveling along.

In addition, the V2V message service apparatus 210, in conjunction with the V2V message server 230, performs an operation to subscribe for or unsubscribe from a multicast group of the relevant road segment when entering or leaving a particular road segment. For example, upon determining that the V2V message service apparatus 210 has entered a particular road segment, it may transmit a subscription request to the V2V message server 230 to subscribe for a topic of the particular road segment.

In addition, the V2V message service apparatus 210 may publish a message to deliver the contents of abnormality, an off-normal state, an event, etc. of the vehicle into the subscribed group.

The V2V message server 230 refers to software or hardware for providing various V2V communication services in conjunction with the V2V message service apparatus 210.

The V2V message server 230 performs connection of the V2V message service apparatus 210 and management of the connection status thereof, subscription and unsubscription operations of the V2V message service apparatus 210 according to a particular road segment, a function of transmitting a message to a subscriber in the group, among other operations.

In addition, the V2V message server 230 detects the abnormality of the vehicle including the V2V message service apparatus 210, and if the off-normal vehicle is detected, transfers the corresponding content to the vehicle existing in the surrounding or particular road segment.

The traffic analysis apparatus 250 refers to software or hardware interworking with the V2V message server 230 for providing various V2V communication services related to a traffic situation.

The traffic analysis apparatus 250 manages information on vehicles passing through a particular road segment from the V2V message server 230 and analyzes traffic flow information or a detection result of off-normal conditions of the vehicle.

In FIG. 2, the V2V message server 230 and the traffic analysis apparatus 250 are illustrated as separate independent devices, but they may be implemented as an integrated server, such as a V2V communication management server (not shown) including components for various services associated with the V2V message service apparatus 210.

Figure 3:
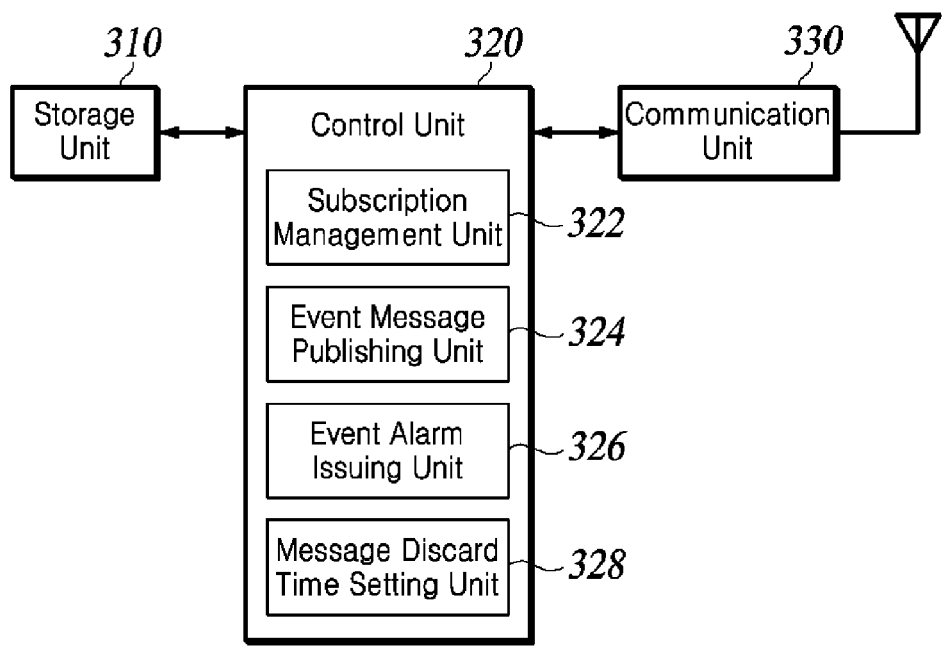
FIG. 3 is a block diagram of a configuration of a V2V message service apparatus according to at least one aspect of the present disclosure.

FIG. 3 is a block diagram of a configuration of a V2V message service apparatus according to at least one aspect of the present disclosure.

As shown in FIG. 3, a V2V message service apparatus 300 may include a storage unit 310, a control unit 320, and a communication unit 330. Each of the components shown in FIG. 3 may be implemented in a hardware chip, or may be implemented in software and implemented to cause a microprocessor to perform the functions of software corresponding to the respective components.

The storage unit 310 stores at least one software application (instruction set) executed by the control unit 320. The software application may be installed, for example, in an embedded form as well as installed by the user's manipulation or commands in an operating system (OS) within the V2V message service apparatus 300.

The software application causes the control unit 320 to obtain information on the road link on which the vehicle is running in real time and to request subscription/upsubscription of the vehicle to the V2V message server 230 based on the obtained road link information. In addition, the software application causes the control unit 320 to receive/publish a message including the topic set at the time of the subscription. In addition, the software application may enable the control unit 320 to check whether an event has occurred from a sensor information of the vehicle. The above-described functions performed by the control unit 320 will be described below with reference to other figures.

The storage unit 310 may be at least one of different types of memories (SD, XD memory, etc.) such as a flash memory type, hard disk type, multimedia card microtype, and card type, and storage medium such as a random access memory (RAM), static dynamic random access memory (SRAM), read only memory (ROM), electrically erasable programmable read-only memory (EEPROM), programmable read-only memory (PROM), magnetic memory, magnetic disk, and optical disk.

The control unit 320 executes various software programs or applications (sets of instructions) stored in the storage unit 310 to perform various functions for the V2V message service apparatus 300 and process data. The control unit 320 may include a subscription management unit 322, an event message publishing unit 324, and an event alarm issuing unit 326. According to an aspect of the present disclosure, the control unit 320 may further include a message discard time setting unit 328.

The subscription management unit 322 checks the location information of the vehicle equipped with the V2V message service apparatus 300 in real time and subscribes to the V2V message server 230 with a topic determined according to the vehicle location information. Here, the vehicle location information includes information on the road link which the vehicle entered and is traveling along. The subscription management unit 322 may obtain information about the road link in which the vehicle is running in real time via a road map providing server, or via a pre-download, or via a cloud server. In addition, the subscription management unit 322 may identify a particular road link which the vehicle entered is traveling along by mapping the vehicle location information obtained through the GPS module or the like to the information on the road link.

The topic is set to a particular road link as described above. Specifically, the subscription management unit 322 subscribes to the V2V message server 230 with a topic of a particular road link identified as where the vehicle entered. More specifically, the subscription management unit 322 subscribes to the V2V message server 230 by setting the identification information of the particular road link where the vehicle entered as a topic.

In addition, the subscription management unit 322 checks the vehicle location information in real time to see if the vehicle's location is out of its subscribed topic, namely, particular road link, and if yes, the subscription management unit 322 requests the V2V message server 230 for an unsubscription from that road link. Here, the request for the unsubscription is not limited to being immediately made when it is confirmed that the location of the vehicle is outside its subscribed particular road link. For example, the subscription management unit 322 may make the unsubscription after waiting for a predetermined amount of time, even if the location of the vehicle is identified as being out of its previously subscribed particular road link. In yet another example, when the vehicle, leaving its subscribed particular road link (e.g., link0001down), enters one or more other road links (e.g., link0002down, link0003down, etc.), the subscription management unit 322 may have the vehicle wait until after confirming that it secondly left one or a predetermined number of other new road links (e.g., link0002down) that the vehicle entered, to unsubscribe from its previously subscribed particular road link (e.g., link0001down). In this case, a subscription is also made in real time for the one or more other road links (e.g., link0002down, link0003down, etc.) when the vehicle just entered there.

The event message publishing unit 324 checks whether an event occurs against a vehicle installed with the V2V message service apparatus 300. The event may include, for example, sudden braking, collision, lane departure, stop due to failure, and such an incident associated with the vehicle. The event message publishing unit 324 may check whether or not the event occurs by using the sensor information after a detection by the sensor module installed in the vehicle, or may check whether the event occurs by using the sensor information collected directly by the V2V message service apparatus 300.

The event message publishing unit 324, upon confirming that the event has occurred, publishes to the V2V message server 230 an event message including the subscribed particular road link as topic. The event message includes at least one of an event occurrence time and an event site, a vehicle driving distance with respect to the particular road link (i.e., the road link where the event occurred), an event type (e.g., an accident, a failure, etc.), and identification information of the vehicle that published the event message. Here, the identification information of the vehicle may be replaced with identification information of a software application providing a V2V message service according to at least one embodiment.

The event message published by the event message publishing unit 324 may be transmitted to all the vehicles in the subscriber group, which sets the same road link as a topic through the V2V message server 230.

The event message published by the event message publishing unit 324 may also be delivered via the V2V message server 230 to all vehicles in the entire subscriber groups that belong to a preset message propagation range from the event spot. Here, the message propagation range refers to a range in which a trailing vehicle exists running possibly affected by the occurrence of a particular event as well as a transmission range of an event message about the particular event (e.g., within 500 m of a radius from an event spot).

The message propagation range may be preset by the V2V message server 230 in view of the event type, the event occurrence time, the road link characteristic (e.g., the high-speed driving segment), the weather condition, or other factors. For example, where a particular event is a vehicle collision accident, it is common that a series of collisions (or a multiple pile-up) affects traffic congestion greater than a simple rear-end collision between two vehicles (e.g., a length of a congestion section or a congestion time, etc.). Therefore, the V2V message server 230 may set the message propagation range to be wider at the event of series of collisions rather than at a simple rear-end collision event.

The message propagation range may be changed every predetermined period (e.g., 10 minutes) or in real time in consideration of the traffic conditions of the particular road link in which the relevant event has occurred and the surrounding road links. The configuration and change information of the message propagation range may be stored in the V2V message server 230.

The event alarm issuing unit 326 checks whether the V2V message service apparatus 300 receives an event message from the V2V message server 230. When it is determined that the V2V message service apparatus 300 receives the event message, the event alarm issuing unit 326 utilizes the received event message to determine whether to issue an alarm corresponding to the received event message.

The event alarm issuing unit 326 may issue an alarm for the received event only when the information included in the received event message is significant to the present vehicle. For example, at the occurrence of an event in which a vehicle stops due to a failure, information on that event is significant to trailing vehicles rather than preceding vehicles to the stopped vehicle, and thus received event messages may undergo a selection process to issue an alarm corresponding to a selected event message.

In order to select from the received event messages, the event alarm issuing unit 326 may compare the identification information of a transmit vehicle in the received event message with the identification information of the present vehicle to issue an alarm when the two identification information is different. Since an event message published with a particular road link set as topic is transmitted to all vehicles corresponding to the particular road link or all vehicles belonging to a subscriber group corresponding to road links within a predetermined message propagation range, a vehicle publishing the event message also receives the same event message back. Accordingly, the event alarm issuing unit 326 may select a case where the identification information of the transmit vehicle is identical to the identification information of the present vehicle, in which case, it determines not to issue an alarm corresponding to the received event message. Meanwhile, the identification information of the vehicle may be replaced with identification information of a software application providing a V2V message service according to some embodiments. In this case, the identification information of the transmit vehicle (or the identification information of the software application in the transmit vehicle) may be included in the received event message.

In addition, the event alarm issuing unit 326 may determine the preceding and trailing relationship between the transmit vehicle of the received event message and the present vehicle in order to select the received event message. In addition, the event alarm issuing unit 326 may determine whether to issue an alarm corresponding to the received event message based on the determined preceding and trailing relationship.

This can be explained by a specific embodiment as follows.

Where a transmit vehicle and a receive vehicle of a particular event message have different respective road links set as their subscription topic, the event alarm issuing unit 326 determines the transmit vehicle to be a preceding vehicle. In other words, when a particular event message is transmitted to a group of subscribers to other road links than a particular road link among the road links within the message propagation range, the event alarm issuing unit 326 determines the transmit vehicle to be a preceding vehicle.

When the transmit vehicle and the receive vehicle of a particular event message have the same road link set as their subscription topic, the event alarm issuing unit 326 compares the driving distance (included in the particular event message) of the transmit vehicle with that of the receive vehicle with respect to a particular road link, thereby determining the vehicle having the longer driving distance as the preceding vehicle.

The event alarm issuing unit 326 issues an alarm corresponding to the received event message when the transmit vehicle is determined to be the preceding vehicle, and it does not issue an alarm corresponding to the received event message when the present vehicle is determined to be the preceding vehicle. When an alarm is issued, the driver of the present vehicle can grasp traffic information of the road link it is traveling based on an event type, an event occurrence time, and the like.

Alternatively, the event alarm issuing unit 326 may determine whether to issue an alarm corresponding to the received event message based on information on whether or not to issue an alarm generated by the V2V message server. To this end, the V2V message server may determine whether the identification information is identical between the transmit vehicle and the receive vehicle of a particular event message and determine the preceding and trailing relationship between the two vehicles, and it may determine whether or not to issue an alarm in the receive vehicle based on the determination results. Here, since the method of determining whether to issue an alarm by the V2V message server is the same as the method of determining whether to issue an alarm by the event alarm issuing unit 326, a detailed description thereof will be omitted. The V2V message server distributes information on the determination of whether to issue the alarm to the receive vehicle along with the corresponding event message.

On the other hand, when a significant amount of time has elapsed from a particular event occurrence time, significantly diminishing the alarm effect on the occurrence of a particular event, or extinguishing the risk factor according to the occurrence of a particular event, the information contained in the particular event message becomes insignificant. For example, where the particular road link in which a sudden stop event occurred is a high-speed driving section, the risk factor for the trailing vehicle due to that sudden stop event occurred lasts only for a relatively short period of time, so that the information on the sudden stop event becomes insignificant after a significant amount of time has elapsed from the occurrence time of the same sudden stop event.

Thus, when a preset message discard time elapses, the event message is discarded and no relevant alarm is issued. Here, the event occurrence time or the distribution time of the event message may be included in the event message. Further, the message discard time may be set and changed by the message discard time setting unit 328 in consideration of an event type, a road link characteristic (e.g., a high-speed driving segment, etc.), a traffic condition, a weather condition, etc. based on the event occurrence time (or the distribution time of the event message).

The communication unit 330 provides a communication function between the V2V message service apparatus 300 and the V2V message server 230 and also includes various software components for processing the transmit and receive messages.

The following will describe a V2V message service method performed by the V2V message service apparatus according to some embodiments using a publish-subscribe communication scheme.

Figure 4:
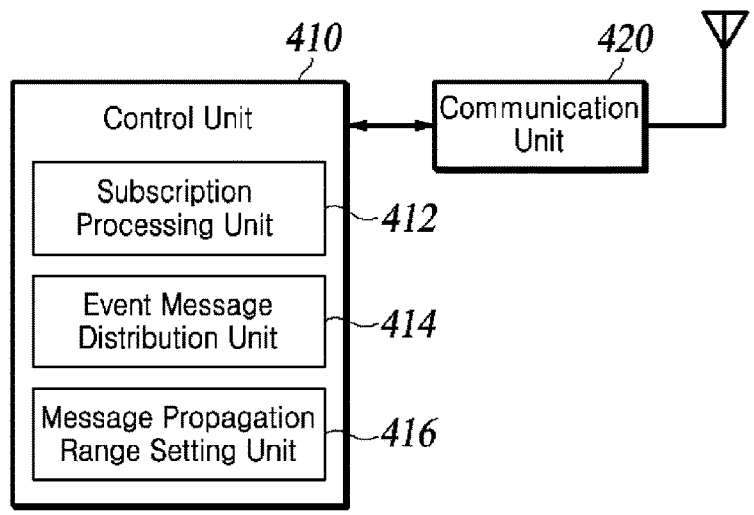
FIG. 4 is a block diagram of a configuration of a V2V message server according to at least one aspect of the present disclosure.

FIG. 4 is a block diagram of a configuration of a V2V message server according to at least one aspect of the present disclosure.

As shown in FIG. 4, the V2V message server 400 may include a control unit 410 and a communication unit 420.

The control unit 410 controls the overall operation of the V2V message server 400, and processes various data for performing various functions such as V2V communication-based message service, safety service, and traffic detection service. The control unit 410 may include a subscription processing unit 412 and an event message distribution unit 414. According to at least one aspect of the present disclosure, the control unit 410 may further include a message propagation range setting unit 416.

The subscription processing unit 412 processes the vehicle's subscription or unsubscription for or from a topic of a particular road link.

The subscription processing unit 412 processes a subscription of a vehicle entering a particular road link. The subscription processing unit 412 processes a subscription of the vehicle entering the particular road link based on a topic in a subscription request signal obtained from that vehicle. Here, the subscription may be processed based on the identification information of the V2V message service apparatus 400 included in each of these vehicles. Here, the topic is set to a particular road link. The road link refers to a single road segment exhibiting a traffic flow in one direction, and each road link is provided with an identifier.

On the other hand, the subscription processing unit 412 processes an unsubscription of a vehicle leaving a particular road link. The subscription processing unit 412 processes an unsubscription of the vehicle that subscribed for the topic based on an unsubscription request signal obtained from the vehicle leaving the particular road link.

The event message distribution unit 414 distributes the event message received through the communication unit 420 from a subscribing vehicle who has set the particular road link as its topic to all the subscribing vehicles belonging to the subscriber group with the same particular road link set as their topic. Here, the event message includes at least one of an event occurrence time and an event site, a vehicle driving distance with respect to the particular road link (i.e., the road link where the event occurred), an event type (e.g., an accident, a failure, etc.), and identification information of the vehicle that published the event message.

The message propagation range setting unit 416 sets a message propagation range for duplicating and distributing the event message received through the communication unit 420 from the subscribing vehicle who has set the particular road link as its topic. Here, the message propagation range refers to a range in which a trailing vehicle exists possibly under the influence of a particular event as well as a transmission range of an event message corresponding to the particular event.

When a message propagation range corresponding to a particular event is set by the message propagation range setting unit 416, the event message distribution unit 414 distributes a particular event message, which is published with a particular road link set as topic, to all vehicles belonging to the subscriber group corresponding to that topic. In addition, event message distribution unit 414 duplicates the particular event message and distributes the duplicates to all vehicles of the entire subscriber groups corresponding to other topics within that message propagation range. When the received event message is duplicated, the event message further includes duplicate information (e.g., a minus sign to the vehicle driving distance) indicating whether the event message is duplicated.

The communication unit 420 provides a communication function between the V2V message service apparatus and the V2V message server 400. In addition, the communication unit 420 may provide a communication function between the V2V message server 400 and the traffic analysis apparatus.

The communication unit 420 according to the present embodiment also includes various software components for processing transmit and receive messages.

Figure 5:
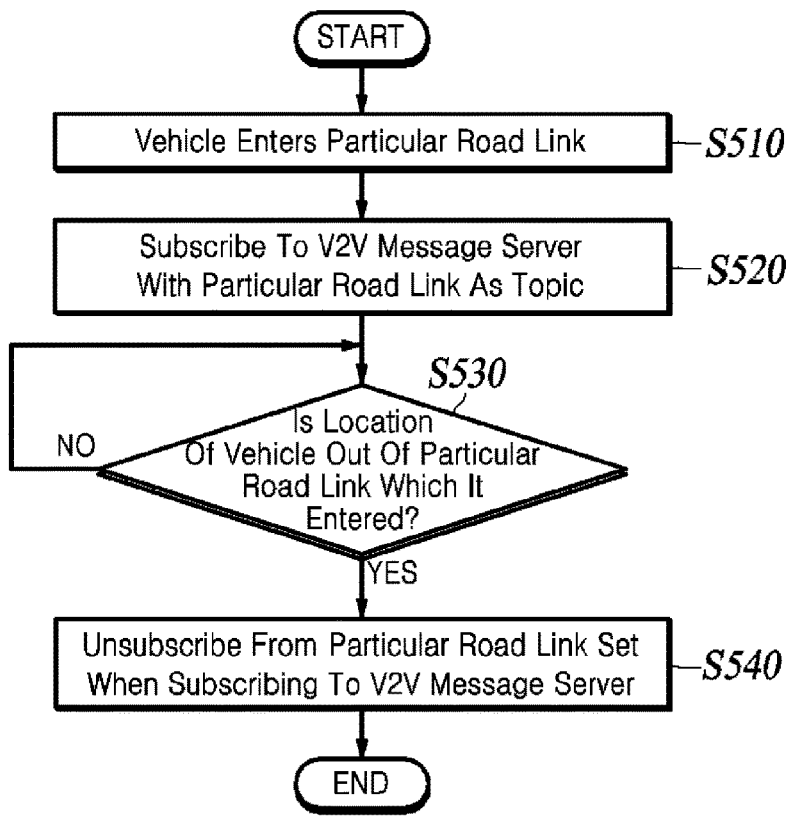
FIG. 5 is a flowchart illustrating a subscription and unsubscription process to and from a V2V message server according to at least one aspect of the present disclosure.

FIG. 5 is a flowchart illustrating a subscription and unsubscription process to and from a V2V message server according to at least one aspect of the present disclosure.

As shown in FIG. 5, when the vehicle enters a particular road link (S510), the V2V message service apparatus, setting the particular road link as a topic, subscribes to the V2V message server in which the publish-subscribe communication function is implemented (S520).

The V2V message server may distribute the V2V message to vehicles that subscribed for the topic of the same message. Here, the topic is set to a particular road link. The road link refers to a single road segment exhibiting a traffic flow in one direction, and each road link is provided with an identifier.

Whether the vehicle enters a particular road link is confirmed from the vehicle location information and information on the road link (e.g., a road link identifier) obtained in real time. Specifically, a particular road link entered by the vehicle may be identified by mapping the vehicle location information to information on the road link. Here, the road link information may be obtained in real time through a road map providing server, through a pre-download, or through a cloud server, and the vehicle location information may be obtained through a GPS module or the like.

Figure 6A:
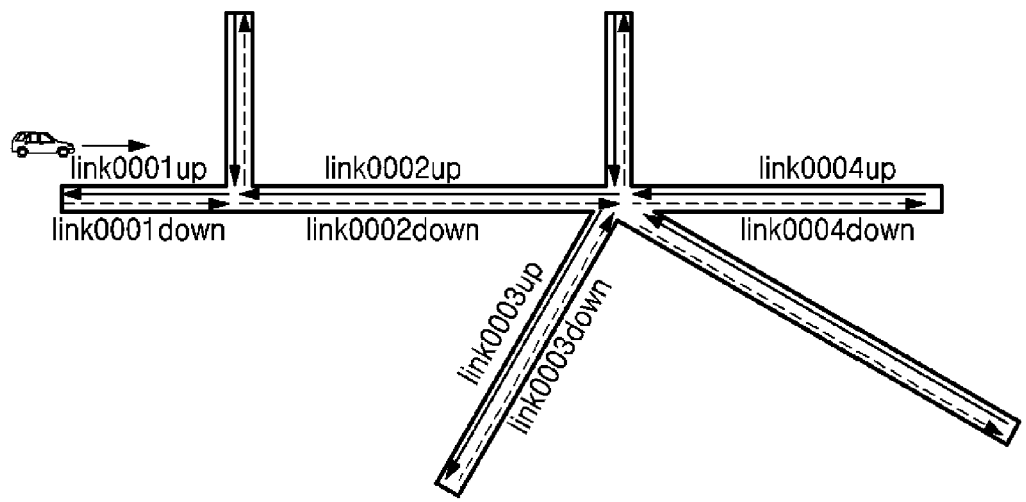
FIG. 6A is an illustration of road links associated with some embodiments of the present disclosure.

An example will be described with reference to FIG. 6A. FIG. 6A is an illustration of road links associated with some embodiments of the present disclosure. For example, when the road link identifiers are assigned as shown in FIG. 6A and the vehicle enters the road link 'link0001down', the vehicle sends a subscription request to the V2V message server with 'link0001down' set as a topic. While traveling along 'link0001down' namely while subscribing to 'link0001down', the vehicle is able to receive a message with 'link0001down' as a topic or to publish a message with 'link0001down' as a topic.

In addition, the V2V message server may distribute the V2V message to all vehicles in the entire subscriber groups that belong to a preset message propagation range from the event spot corresponding to the message. Here, the message propagation range refers to a range in which a vehicle exists possibly under the influence of a particular event as well as a transmission range of an event message corresponding to the particular event. The message propagation range may be preset by the V2V message server 230, taking into account the type of event, the occurrence time of event, the weather condition, or other factors. In addition, the message propagation range may be changed every predetermined period (e.g., 10 minutes) or in real time in consideration of the traffic conditions of the particular road link in which the relevant event has occurred and the surrounding road links.

Figure 6B:
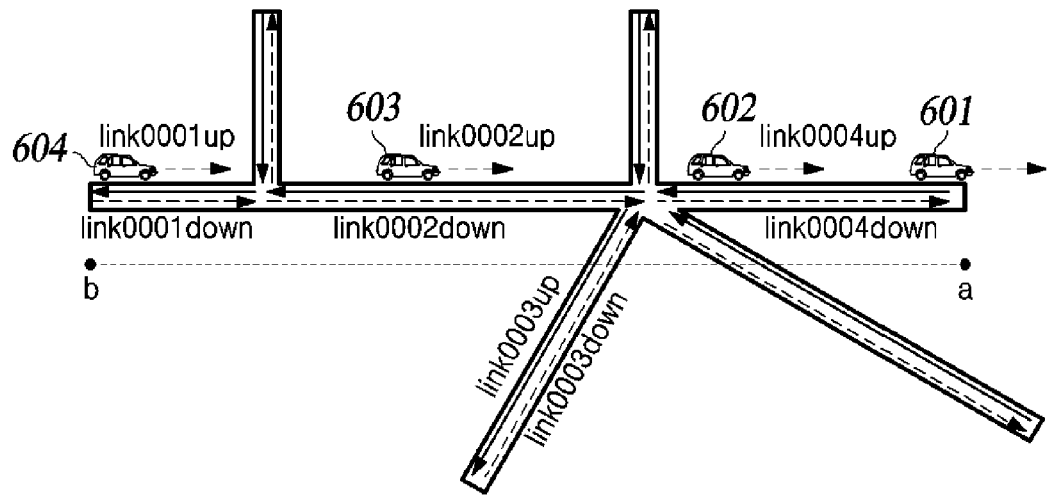
FIG. 6B is an illustration of a message propagation range associated with the some embodiments of the present disclosure.

An example will be described with reference to FIG. 6B. FIG. 6B is an illustration of a message propagation range associated with the some embodiments of the present disclosure.

As shown in FIG. 6B, the message propagation range for the vehicle failure event is set by the V2V message server 230 from the relevant event spot backwards at 1,500 m point behind in the traveling direction. A failure has occurred in a first vehicle 601, causing three road links ('link0004down', 'link0002down', and 'link0001down') to be included in the message propagation range extending from event spot (a) back to 1,500 m point (b) behind in the traveling direction. Accordingly, the V2V message server 230 distributes the message about the vehicle failure event to four vehicles 601, 602, 603, and 604 that subscribe for their respective road links as topic.

Specifically, the V2V message server 230 distributes the event message to the first vehicle 601 and the second vehicle 602 belonging to the subscriber group for that topic. Here, the event message includes 'link0004down', which is the road link on which a vehicle failure occurred, as a topic. In addition, the third vehicle 603 and the fourth vehicle 604 do not belong to the subscriber group for the topic of 'link0004down' but belong to the message propagation range, and therefore the V2V message server 230 duplicates the event message published by the first vehicle 601 and distributes the duplicates to the third vehicle 603 and the fourth vehicle 604. In this case, the V2V message server 230 performs a duplication process of an event message including 'link0004down' as a topic instead of publishing event messages including 'link0002down' and 'link0001down' as the topic, respectively.

After the vehicle subscribed for a particular road link that it entered, the method according to the present embodiment determines whether the vehicle is out of a particular road link (S530). When it is determined that the vehicle location is out of the particular road link for which the vehicle has subscribed, unsubscription is made from the particular road link that the vehicle has set when subscribing to the V2V message server (S540).

An example of FIG. 6A will be described as follows. When it is determined that the vehicle enters the road link 'link0002down' beyond the road link 'link0001down' which it already subscribed for, an unsubscription is made from the subscribed road link 'link0001down' and a subscription is made for the newly entered road link 'link0002down'.

Alternatively, an unsubscription may not be made right after identifying the location of the vehicle to be out of the subscribed particular road link but it may be made after satisfying a predetermined condition. For example, an unsubscription may be made after a predetermined amount of time has elapsed from when the vehicle's location has been confirmed to be out of the particular road link for which the vehicle has subscribed. In yet another example, when the vehicle, leaving its subscribed particular road link (e.g., link0001down), enters one or more other road links (e.g., link0002down, link0003down, etc.), an unsubscription may be made from the vehicle's previously subscribed particular road link (e.g., link0001down) after confirming that the vehicle secondly left one or a predetermined number of other new road links (e.g., link0002down) that it entered. In this case, a subscription is also made in real time for the one or more other road links (e.g., link0002down, link0003down, etc.) when the vehicle just entered there.

Figure 7:
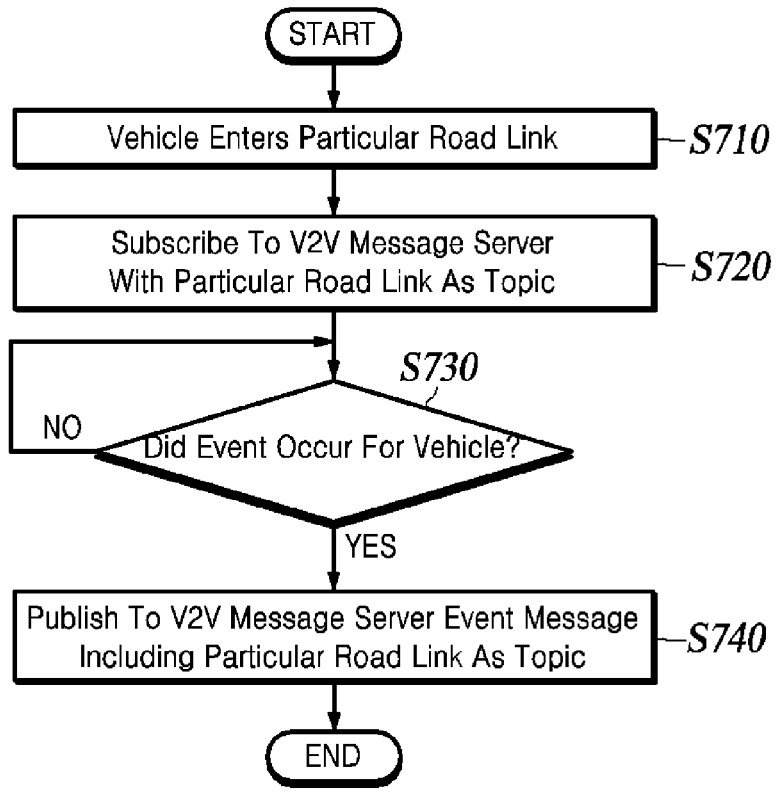
FIG. 7 is a flowchart of a process of publishing an event message according to at least one aspect of the present disclosure.

FIG. 7 is a flowchart of a process of publishing an event message according to at least one aspect of the present disclosure.

As shown in FIG. 7, when a vehicle enters a particular road link (S710) and subscribes to the V2V message server with its particular road link entered set as topic (S720), the V2V message service apparatus checks whether an event occurred against the vehicle (S730). Events may include, for example, sudden braking, collision, lane departure, stop due to failure, and the like associated with the vehicle. Whether or not the event occurs may be confirmed from sensor information from a sensor module mounted in the vehicle, or may be confirmed from sensor information collected directly by a V2V message service apparatus.

When it is confirmed that an event has occurred against the vehicle, an event message is published to the V2V message server with its particular road link entered set as topic (S740). The event message includes at least one of an event occurrence time and an event site, a vehicle driving distance for the particular road link (i.e., the road link where the event occurred), an event type (e.g., an accident, a failure, etc.), and identification information of the vehicle that published the event message. Here, the identification information of the vehicle may be replaced with identification information of a software application providing a V2V message service according to at least one embodiment.

The published event message is delivered through the V2V message server to all vehicles in the group of subscribers who set the same road link as a topic.

In addition, the published event message may be delivered from an event spot through a V2V message server to all vehicles in the entire subscriber groups belonging to a preset message propagation range.

Figure 8A:
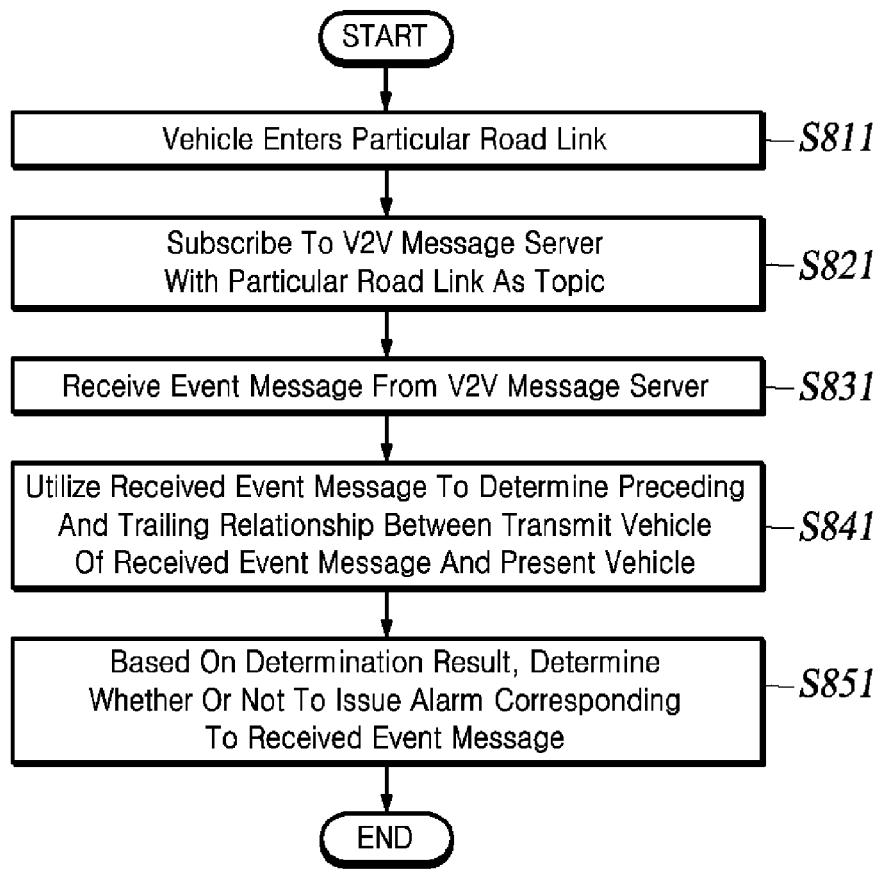
FIG. 8A is a flowchart of an example process of issuing an alarm for an event message according to at least one aspect of the present disclosure.

FIG. 8A is a flowchart of an example process of issuing an alarm for an event message according to at least one aspect of the present disclosure.

As shown in FIG. 8A, when a vehicle enters a particular road link (S811), it subscribes to a V2V message server with its particular road entered set as topic (S821), at which time the vehicle receives, from the V2V message server, an event message published by one of the road links within a predetermined message propagation range (S831).

The V2V message service apparatus utilizes the received event message to determine a preceding and trailing relationship between the transmit vehicle of the received event message and the present vehicle (Step S841), and to determine, based on the determination by Step S841, whether to issue an alarm corresponding to the received event message (Step S851).

Step S841 is to issue an alarm for the received event only if the information included in the received event message is significant to the present vehicle. For example, at the occurrence of an event that a vehicle stops due to a failure, information on that event is significant to trailing vehicles rather than preceding vehicles of the stopped vehicle, and an alarm is arranged to be issued corresponding to a selected event message after selecting among event messages received.

Alternatively, the V2V message service apparatus may determine whether to issue an alarm corresponding to the received event message sans performing Steps S841 and S851 but based on information on whether or not to issue an alarm, which is generated by the V2V message server. To this end, the V2V message server determines a preceding and trailing relationship between a transmit vehicle and a receive vehicle of a particular event message, determines whether to issue an alarm in the receive vehicle based on the determination result, and distributes, to the receive vehicle, the information on the determination of whether to issue an alarm along with the corresponding event message.

Figure 8B:
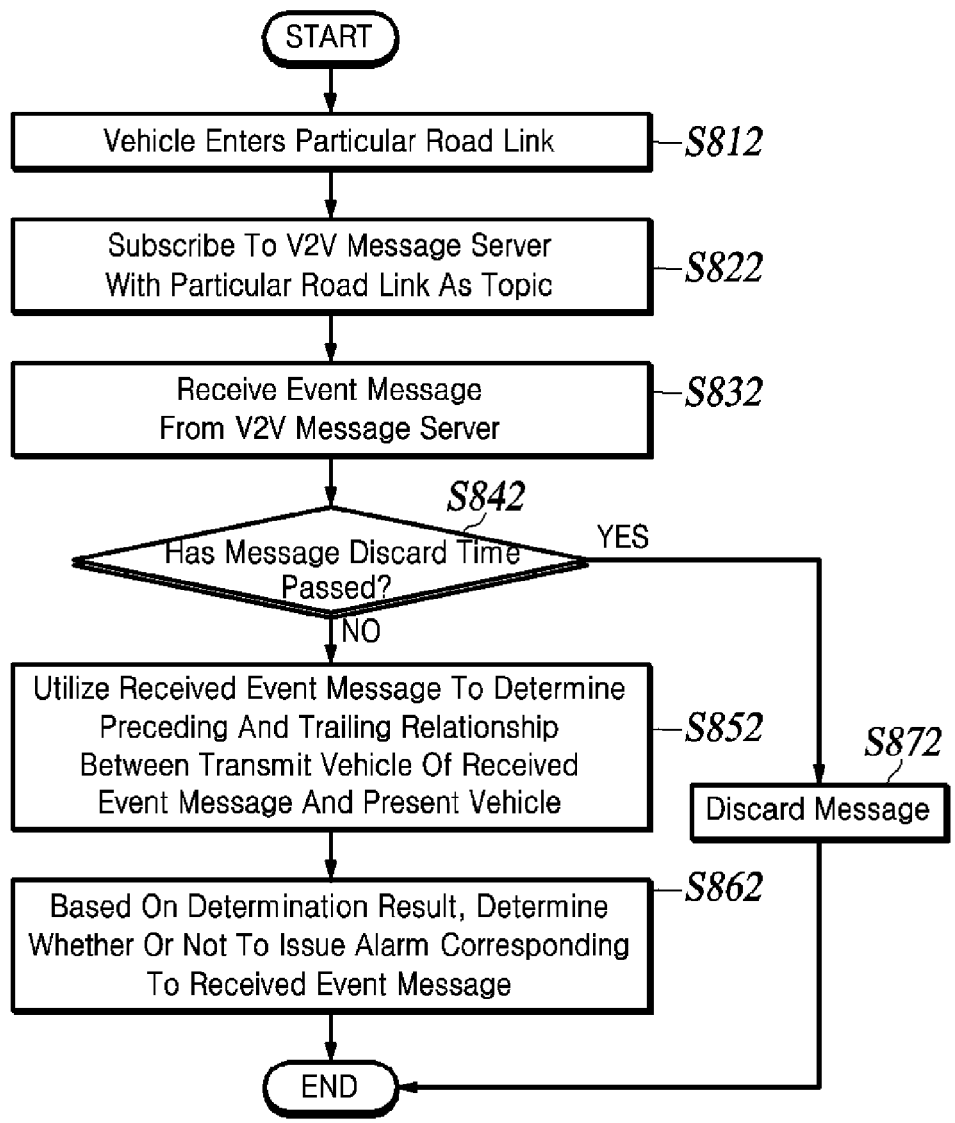
FIG. 8B is a flowchart illustrating another example process of issuing an alarm for an event message according to at least one aspect of the present disclosure.

FIG. 8B is a flowchart illustrating another example process of issuing an alarm for an event message according to at least one aspect of the present disclosure.

As shown in FIG. 8B, when a vehicle enters a particular road link (S812), it subscribes to a V2V message server with its particular road entered set as topic (S822), at which time the vehicle receives, from the V2V message server, an event message published by one of the road links within a predetermined message propagation range (S832).

In Step S842, the V2V message service apparatus determines whether a message discard time corresponding to the received event message has elapsed.

Step S842 is to issue an alarm for the received event only if the information included in the received event message is significant to the present vehicle. For example, where a particular road link in which an event occurs is a high-speed driving segment, the risk factor against a trailing vehicle due to the occurrence of the event, say a sudden stop lasts for a relatively short period of time, so that after a significant amount of time has elapsed from the occurrence time of the sudden stop event, the information on that sudden stop event becomes insignificant. Therefore, the V2V message service apparatus issues an alarm only for an event message in which a preset message discard time has not elapsed. Here, the message discard time may be set and changed in consideration of an event type, a road link characteristic (e.g., a high-speed driving segment, etc.), a traffic condition, a weather condition, etc. based on an event occurrence time (or an event message distribution time).

As a result of the determination in Step S842, when the message discard time has not elapsed ('NO'), the V2V message service apparatus utilizes the received event message to determine a preceding and trailing relationship between the transmit vehicle and the receive vehicle of the relevant event message (S852), and based on the determination result, it determines whether to issue an alarm corresponding to the received event message (S862).

Alternatively, the V2V message service apparatus may determine whether to issue an alarm corresponding to the received event message sans performing Steps S852 and S862 but based on information on whether or not to issue an alarm, which is generated by the V2V message server. To this end, the V2V message server determines a preceding and trailing relationship between the transmit vehicle and the receive vehicle of the particular event message, determines whether to issue an alarm in the receive vehicle based on the determination result, and distributes, to the receive vehicle, the information on the determination of whether to issue an alarm along with the corresponding event message.

As a result of the determination in Step S842, when the message discard time has elapsed ('YES'), the V2V message service apparatus in Step S872 discards the event message and does not issue a corresponding alarm.

Figure 9:
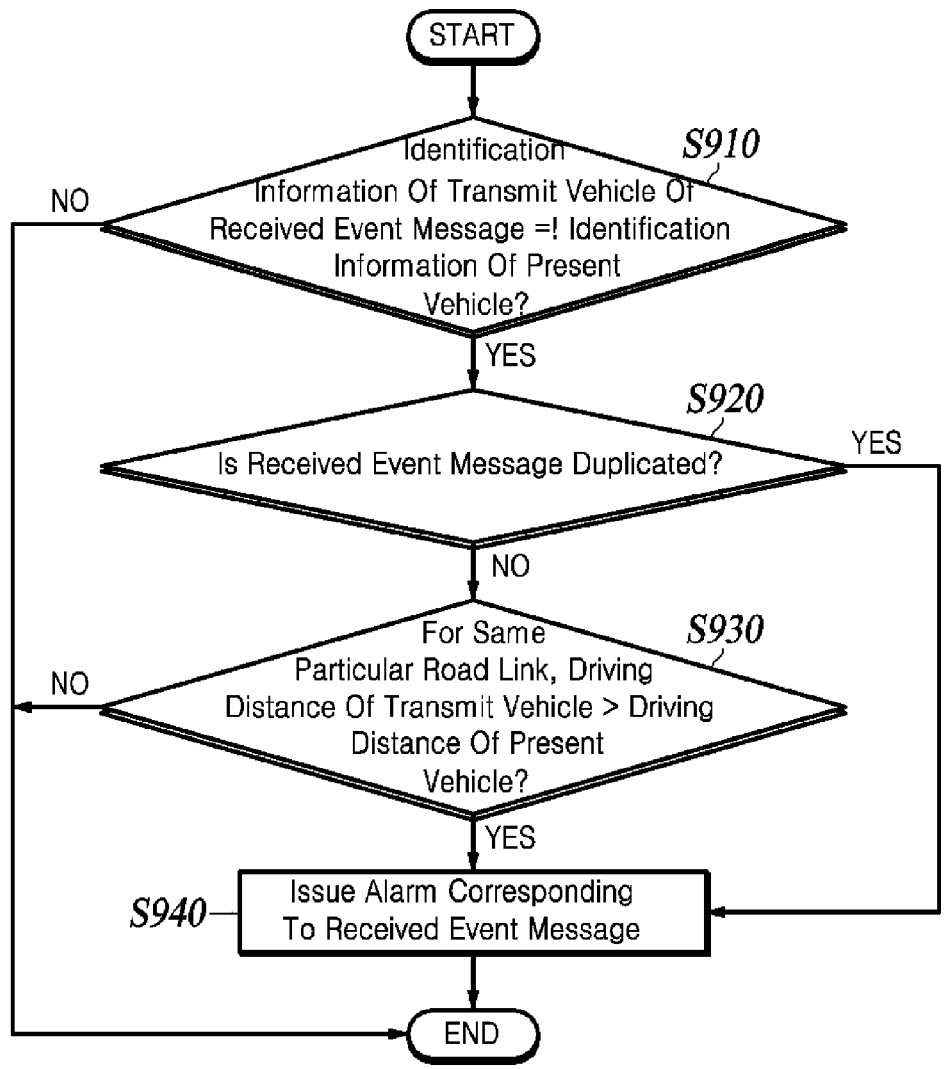
FIG. 9 is a flowchart of a process of determining whether to issue an alarm for an event message according to at least one aspect of the present disclosure.

FIG. 9 is a flowchart of a process of determining whether to issue an alarm for an event message according to at least one aspect of the present disclosure. The process of FIG. 9 corresponds to Steps S841 and S851 of FIG. 8A and Steps S852 and S862 of FIG. 8B, respectively.

As shown in FIG. 9, in order to select from the received event messages, the V2V message service apparatus compares the identification information of the transmit vehicle in the received event message with that of the present vehicle to determine whether the two identification information is identical (S910).

Since an event message published including a particular road link as topic is transmitted to all vehicles corresponding to the particular road link or all vehicles corresponding to road links within a predetermined message propagation range, a vehicle publishing the event message receives the same event message back, too. Therefore, the V2V message service apparatus may issue an alarm corresponding to the event message received only if the identification information of the transmit vehicle is not the same as that of the present vehicle. Meanwhile, the identification information of the vehicle may be replaced with that of a software application providing a V2V message service according to at least one embodiment. In addition, the identification information of the transmit vehicle (or the identification information of the software application in the transmit vehicle) may be included in the received event message.

When the identification information of the transmit vehicle in the received event message is different from that of the present vehicle, the V2V message service apparatus determines whether that event message is duplicated by the V2V message server (S920).

The V2V message server distributes the published event message including a particular road link as topic to all vehicles corresponding to that particular road link or to all vehicles corresponding to road links in the predetermined message propagation range. At this time, the V2V message server distributes the same event message as is to the vehicles who have subscribed with the particular road link set as topic. However, to such vehicles (hereinafter, referred to as "other topic vehicles") that subscribed with topics of other road links than the particular road link, the V2V message server duplicates the relevant event message and distributes the duplicates. Here, other topic vehicles are vehicles within the predetermined message propagation range which is set to a predetermined range following the transmit vehicle, so that such other topic vehicles are always trailing vehicles of the transmit vehicle. Therefore, the V2V message service apparatus in receipt of the event message may determine a preceding and trailing relationship with the transmit vehicle depending on whether the corresponding event message is duplicated.

To this end, the V2V message server may include in the relevant event message a duplicate information indicating whether or not the event message is duplicated. For example, when the event message is duplicated, the V2V message server may set the driving distance value included in the relevant event message to a negative number (e.g., −30).

When Step S920 determines that the received event message is duplicated ('YES'), the transmit vehicle is determined to be the preceding vehicle, and the V2V message service apparatus issues an alarm corresponding to that event message (S940). With the alarm issued, the driver of the vehicle can grasp traffic information of the driving road link based on an event type, an event occurrence time, and the like.

When Step S920 determines that the received event message is not duplicated ('NO'), the V2V message service apparatus compares between the driving distance of the transmit vehicle and that of the present vehicle with respect to the same particular road link and thereby determines the preceding and trailing relationship between the two vehicles (S930).

Step S940 determines when the driving distance of the transmit vehicle is longer than that of the present vehicle ('YES'), to determine the transmit vehicle to be the preceding vehicle, and the V2V message service apparatus issues an alarm corresponding to the relevant event message (S940).

Alternatively, the V2V message service apparatus may determine whether to issue an alarm corresponding to the received event message sans performing Steps S930 and S940 but based on information on whether or not to issue an alarm, which is generated by the V2V message server. To this end, the V2V message server determines a preceding and trailing relationship between the transmit vehicle and the receive vehicle of the particular event message, determines whether to issue an alarm in the receive vehicle based on the determination result, and distributes, to the receive vehicle, the information on the determination of whether to issue an alarm along with the relevant event message.

When Step S920 determines that the driving distance of the vehicle is longer than that of the transmit vehicle ('NO'), the present vehicle is determined to be the preceding vehicle, and the V2V message service apparatus does not issue an alarm corresponding to the relevant event message.

Figure 10:
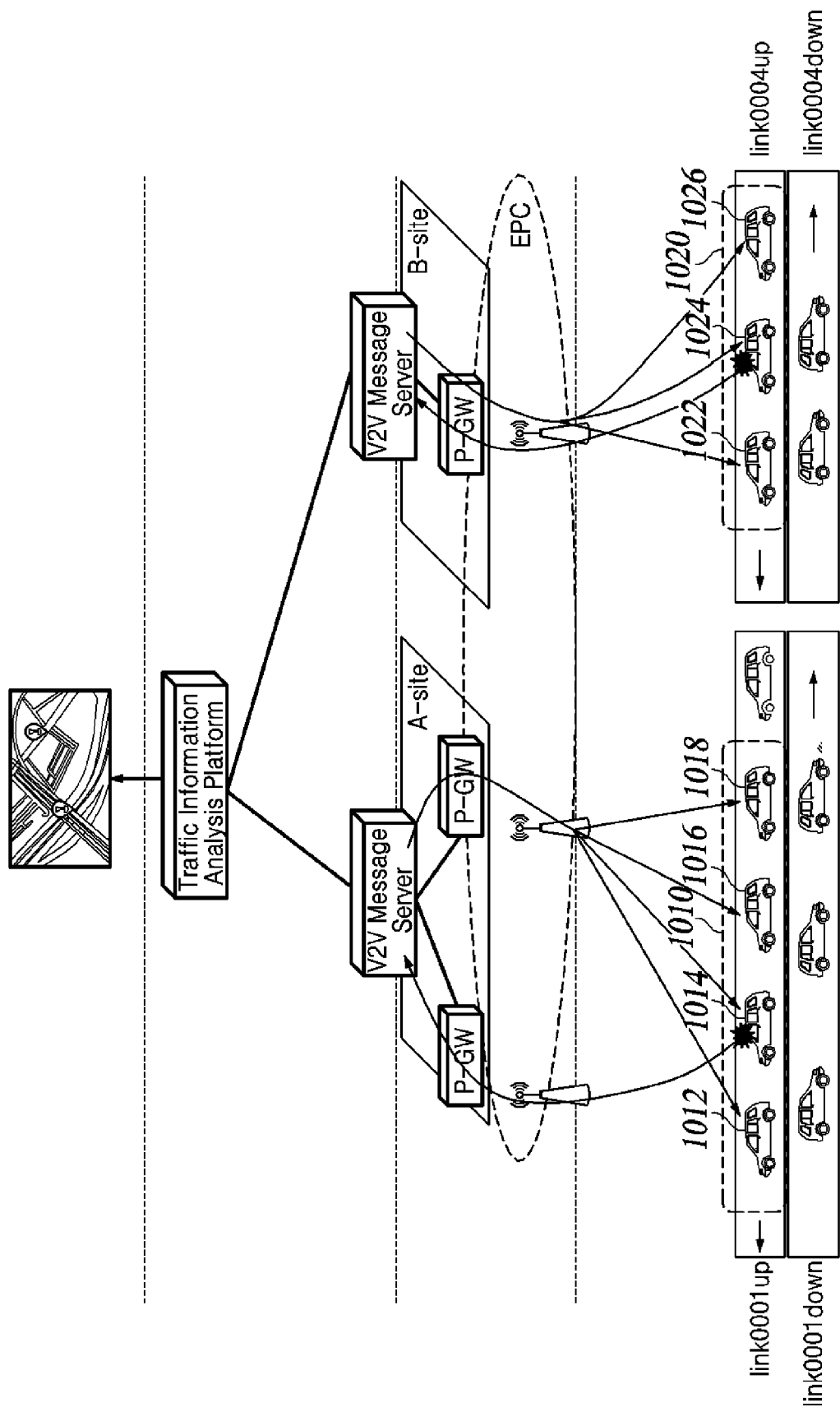
FIG. 10 is a conceptual diagram illustrating an example application of a V2V message service system according to at least one aspect of the present disclosure.

FIG. 10 is a conceptual diagram illustrating an example application of a V2V message service system according to at least one aspect of the present disclosure.

In particular, it is essential to minimize latency in delivering event messages related to safety, such as notification of an accident. To this end, as shown in FIG. 10, the V2V message server is distributed in the same network as the PDN Gateway (P-GW) of each region, thereby minimizing latency. For example, as shown in FIG. 10, the V2V message server built in the A-site transmits a message of a subscriber group 1010 that subscribed with the road link 'link0001up' set as topic, and the V2V message server built in the B-site transmits a message of a subscriber group 1020 that subscribed with the road link 'link0004up' set as topic.

According to at least one embodiment of the present disclosure, when an event occurs at one vehicle 1014 in the subscriber group 1010 of the road link 'link0001up' to publish an event message, an event message is delivered to vehicles 1012, 1014, 1016, and 1018 in the subscriber group 1010 through the V2V message server built in the A-site. Among the vehicles 1012, 1014, 1016, and 1018 that received the event message, the trailing vehicles 1016 and 1018 of the message publishing vehicle 1014 may issue an alarm corresponding to the received event message.

On the other hand, when an event occurs at one vehicle 1024 in the subscriber group 1020 of the road link 'link0004up' to publish an event message, the event message is transmitted to vehicles 1022, 1024, and 1026 in the subscriber group 1020 through the V2V message server built in the B-site. Among the vehicles 1022, 1024, and 1026 in receipt of the event message, the trailing vehicle 1026 of the message publishing vehicle 1024 may issue an alarm corresponding to the received event message.

Each V2V message server, which is distributed and constructed, transmits event information obtained from a subscriber group to a traffic information analysis platform, thereby enabling the event information to be utilized in analysis such as traffic information prediction.

Figure 11A:
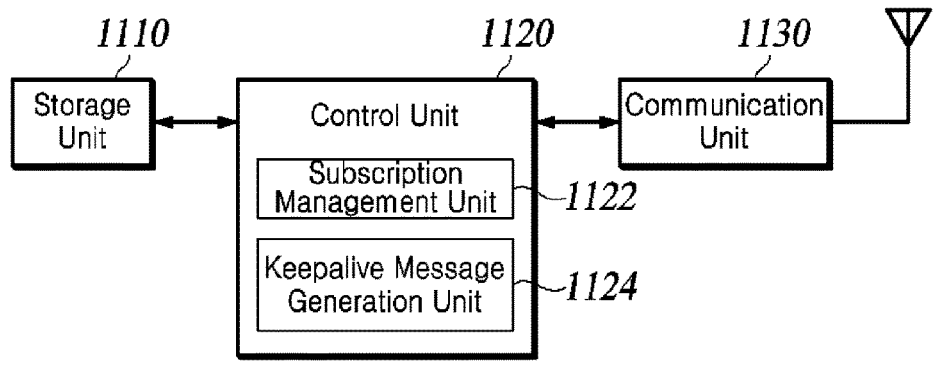
FIG. 11A is a block diagram of a configuration of a V2V message service apparatus according to another embodiment of the present disclosure.

FIG. 11A is a block diagram of a configuration of a V2V message service apparatus according to another embodiment of the present disclosure.

As shown in FIG. 11A, the V2V message service apparatus 1100 includes a storage unit 1110, a control unit 1120, and a communication unit 1130. Each of the components shown in FIG. 11A may be implemented in a hardware chip, or may be implemented in software and implemented to cause a microprocessor to perform the functions of software corresponding to each component.

The storage unit 1110 stores at least one software application (instruction set) executed by the control unit 1120. The software application may be installed, for example, in an embedded form as well as installed by the user's manipulation or commands in an operating system (OS) within the V2V message service apparatus 1100.

The software application causes the control unit 1120 to obtain information on the road link on which the vehicle is running in real time and to request subscription/unsubscription of the vehicle based on the obtained road link information to a V2V message server 1200 according to some embodiments. In addition, the software application causes the control unit 1120 to receive/publish a message including the topic set at the time of the subscription. In addition, the software application may enable the control unit 1120 to check whether an event has occurred from a sensor information of the vehicle. The above-described functions performed by the control unit 1120 will be described below with reference to other figures.

The storage unit 1110 may be at least one of different types of memories (SD, XD memory, etc.) such as a flash memory type, hard disk type, multimedia card microtype, and card type, and storage medium such as a RAM, SRAM, ROM, EEPROM, PROM, magnetic memory, magnetic disk, and optical disk.

The control unit 1120 executes various software programs or applications (sets of instructions) stored in the storage unit 1110 to perform various functions for the V2V message service apparatus 1100 and process data. The control unit 1120 includes a subscription management unit 1122 and a keepalive message generation unit 1124.

The subscription management unit 1122 checks the location information of the vehicle equipped with the V2V message service apparatus 1100 in real time and subscribes to the V2V message server 1200 with a topic determined according to the vehicle location information. Here, the vehicle location information includes information on the road link which the vehicle entered and is traveling along. The subscription management unit 1122 may obtain information about the road link in which the vehicle is running in real time via a road map providing server, or via a pre-download, or via a cloud server. In addition, the subscription management unit 1122 may identify a particular road link in which the vehicle entered is traveling by mapping the vehicle location information obtained through the GPS module or the like to the information on the road link.

The topic is set to a particular road link as described above. Particularly, the subscription management unit 1122 subscribes to the V2V message server 1200 with an identified particular road link where the vehicle has entered set as topic. More particularly, the subscription management unit 1122 subscribes to the V2V message server 1200 by setting the identification information of the particular road link where the vehicle entered as a topic.

In addition, the subscription management unit 1122 checks the vehicle location information in real time to see if the vehicle's location is out of its subscribed topic, namely, particular road link, and if yes, the subscription management unit 1122 requests the V2V message server 1200 for an unsubscription from that road link. Here, the request for the unsubscription is not limited to being immediately made upon confirming that the location of the vehicle is outside its subscribed particular road link. For example, the subscription management unit 1122 may make the unsubscription after waiting for a predetermined amount of time, even if the location of the vehicle is identified as being out of its previously subscribed particular road link. In yet another example, when the vehicle, leaving its subscribed particular road link (e.g., link0001down), enters one or more other road links (e.g., link0002down, link0003down, etc.), the subscription management unit 1122 may have the vehicle wait until after confirming that it secondly left one or a predetermined number of other new road links (e.g., link0002down) that the vehicle entered, to unsubscribe from its previously subscribed particular road link (e.g., link0001down). In this case, a subscription is also made in real time for the one or more other road links (e.g., link0002down, link0003down, etc.) when the vehicle just entered there.

The keepalive message generation unit 1124 processes the subscription between the V2V message service apparatus 1100 and the V2V message server 1200 while transmitting a keepalive message every present period of a keepalive time of the keepalive message, namely every preset keepalive time window. Here, the keepalive message means a message for propagating that the V2V message service apparatus 1100 is activated after being subscribed for the topic.

The keepalive message generation unit 1124 transmits a keepalive message in a keepalive time even if there is no movement of the vehicle including the V2V message service apparatus 1100. In other words, the keepalive message generation unit 1124 transmits a keepalive message every keepalive time window until an unsubscription is made from the topic. However, the keepalive message generation unit 1124 cannot transmit the keepalive message when the V2V message service apparatus 1100 has a communication problem such as network error, navigation system termination, etc.

The communication unit 1130 provides a communication function between the V2V message service apparatus 1100 and the V2V message server 1200 and also includes various software components for processing transmit and receive messages.

Figure 11B:
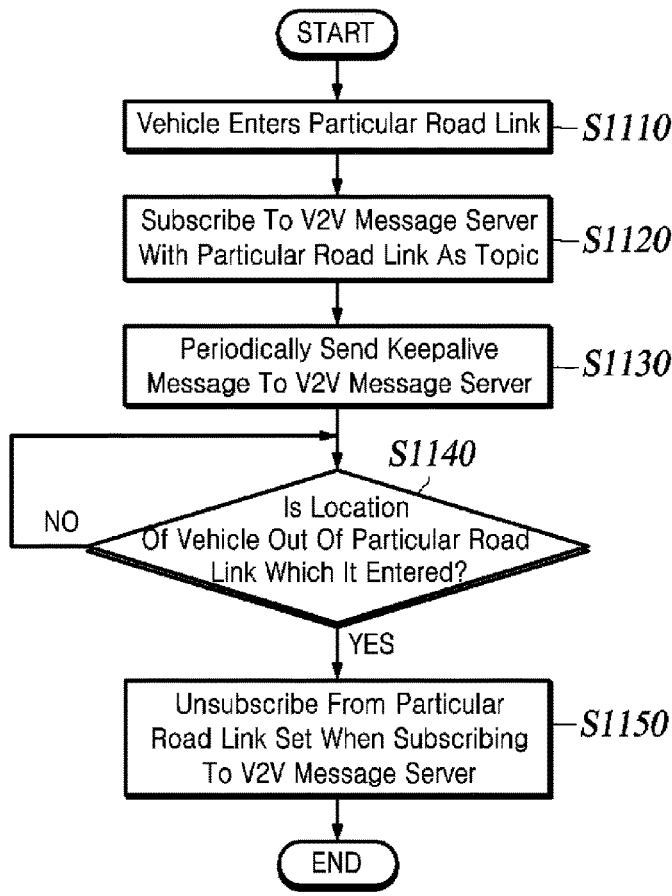
FIG. 11B is a flowchart illustrating a subscription and unsubscription process to and from a V2V message server according to another aspect of the present disclosure.

FIG. 11B is a flowchart illustrating a subscription and unsubscription process to and from a V2V message server according to another aspect of the present disclosure.

As shown in FIG. 11B, when the vehicle enters a particular road link (S1110), a V2V message service apparatus according to some embodiments subscribes to the V2V message server with its particular road link entered set as topic (S1120).

The V2V message server is provided as a server in which the publish-subscribe communication function is implemented, and it distributes a V2V message based on topics of V2V messages, to vehicles subscribed for those respective topics. Here, the topic is set to a particular road link. The road link refers to a single road segment exhibiting a traffic flow in one direction, and each road link is provided with an identifier.

In addition, the V2V message server may distribute the message to all vehicles in the entire subscriber groups belonging to a preset message propagation range from the event spot.

When the distributed message first published by a preceding vehicle is received by its trailing vehicle, the trailing receive vehicle may issue an alarm corresponding to the same message.

Whether the vehicle enters a particular road link is confirmed from the vehicle location information and information on the road link (e.g., a road link identifier) obtained in real time. Specifically, a particular road link entered by the vehicle may be identified by mapping the vehicle location information to information on the road link. Here, the road link information may be obtained in real time through a road map providing server, through a pre-download, or through a cloud server, and the vehicle location information may be obtained through a GPS module or the like.

The V2V message service apparatus 1100 transmits a keepalive message to the V2V message server 1200 every predetermined keepalive time window (S1130). Specifically, the V2V message service apparatus 1100 transmits a keepalive message every preset keepalive time window while processing the subscription with the V2V message server 1200.

The V2V message service apparatus 1100 transmits a keepalive message to the V2V message server 1200 in a keepalive time even if there is no movement of the vehicle. In other words, the V2V message service apparatus 1100 transmits a keepalive message every keepalive time window until an unsubscription is made from the topic.

After the vehicle subscribed for a particular road link it has entered, the method according to some embodiments of the present disclosure determines whether the location of the vehicle is out of its subscribed particular road link (S1140). When it is determined that the location of the vehicle is out of its subscribed particular road link, unsubscription is made out of that particular road link set when subscribing to the V2V message server (S1150).

Figure 12A:
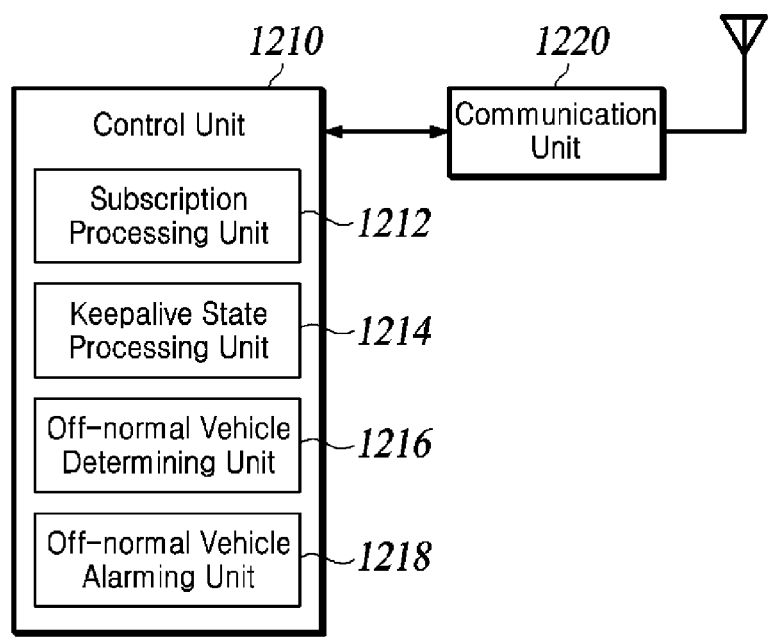
FIG. 12A is a block diagram of a configuration of a V2V message server according to yet another aspect of the present disclosure.

FIG. 12A is a block diagram of a configuration of a V2V message server according to yet another aspect of the present disclosure.

As shown in FIG. 12A, a V2V message server 1200 includes a control unit 1210 and a communication unit 1230.

The control unit 1210 controls the overall operation of the V2V message server 1200 and processes various data for performing various functions such as V2V communication-based message service, safety service, and traffic detection service. The control unit 1210 includes a subscription processing unit 1212, a keepalive state processing unit 1214, an off-normal vehicle determination unit 1216, and an off-normal vehicle notification unit 1218.

The subscription processing unit 1212 processes the vehicle's subscription or unsubscription for or from a topic of a particular road link.

The subscription processing unit 1212 processes a subscription of a vehicle entering a particular road link. The subscription processing unit 1212 processes a subscription of the vehicle entering the particular road link based on a topic in a subscription request signal obtained from that vehicle. Here, the subscription may be processed based on the identification information of the V2V message service apparatus 1100 included in each of these vehicles. Here, the topic is set to a particular road link. The road link refers to a single road segment exhibiting a traffic flow in one direction, and each road link is provided with an identifier.

The subscription processing unit 1212 causes an entry time of the vehicle to be sent to the traffic analysis apparatus 1300 after the processing of the subscription of the vehicle entering the particular road link.

On the other hand, the subscription processing unit 1212 processes an unsubscription of the vehicle leaving the particular road link. The subscription processing unit 1212 processes the unsubscription of the departing vehicle that subscribed for the topic based on an unsubscription request signal obtained from that vehicle.

The subscription processing unit 1212 causes the departure time of the vehicle to be sent to the traffic analysis apparatus 1300 after the processing of the unsubscription of the vehicle leaving the particular road link.

The keepalive state processing unit 1214 manages the connection between the V2V message service apparatus 1100 and the V2V message server 1200 according to whether or not the keepalive message is received.

The keepalive state processing unit 1214 sets a keepalive time window of the keepalive message. Here, the keepalive time window means a period set on the basis of a keepalive time setting value included in a connection request signal for subscription for a topic of a particular road link. For example, the keepalive state processing unit 1214 may set the keepalive time of the keepalive message to 20 ms based on the request of the V2V message service apparatus 1100.

The keepalive state processing unit 1214 updates the keepalive time value to an initial value when receiving a keepalive message within the keepalive time from the V2V message service apparatus 1100. For example, when the keepalive message is received from the V2V message service apparatus 1100 while the keepalive time of the keepalive message is counted from 20 seconds down to 10 seconds, the keepalive state processing unit 1214 changes the keepalive time back to 20 seconds to start counting.

In another case, upon receiving a predetermined message (e.g., location information, map information, etc.) corresponding to a predefined protocol rather than a keepalive message from the V2V message service apparatus 1100 within the keepalive time, the keepalive state processing unit 1214 may set the keepalive time while being counted, to the initial value.

Meanwhile, when failing to receive the keepalive message within the keepalive time from the V2V message service apparatus 1100, the keepalive state processing unit 1214 terminates the connection between the V2V message service apparatus 1100 and the V2V message server 1200.

The off-normal vehicle determination unit 1216 checks whether or not the vehicle entering the particular road link has an abnormality, and it determines whether the vehicle is off-normal according to the check result.

When the vehicle that entered the particular road link is not out of the particular road link within a predetermined vehicle passing time, the off-normal vehicle determination unit 1216 determines whether or not the vehicle has an abnormality. Specifically, at a state confirmation request for the vehicle that has been determined not to be out of a particular road link within a predetermined vehicle passing time, the off-normal vehicle determination unit 1216 determines whether or not that vehicle has an abnormality. Here, the vehicle passing time refers to a time calculated by multiplying an average traffic flow time value calculated from traffic flow information such as an entry time/departure time of vehicles normally passing through the relevant segment by a predetermined multiplier (X). The vehicle passing time is preferably, but not necessarily, calculated by the traffic analysis apparatus 1300.

The off-normal vehicle determination unit 1216 determines whether the vehicle is off-normal with respect to a vehicle before a confirmed unsubscription from the topic of the particular road link.

The off-normal vehicle determination unit 1216 preferentially checks the vehicle connection state of the vehicle before the confirmed unsubscription. Specifically, the off-normal vehicle determination unit 1216 confirms whether the keepalive message is obtained after being transmitted from the vehicle before the confirmed unsubscription.

Upon correctly receiving the keepalive message from the vehicle before the confirmed unsubscription, the off-normal vehicle determination unit 1216 determines a normal connection of the vehicle between the V2V message service apparatus 1100 and the V2V message server 1200 and determines that the vehicle is off-normal. The off-normal vehicle determination unit 1216 transmits information on the determined off-normal vehicle to the off-normal vehicle notification unit 1218 for allowing an off-normal vehicle dwell segment to be registered.

On the other hand, when the keepalive message is not normally received from the vehicle before the confirmed unsubscription, the off-normal vehicle determination unit 1216 determines an off-normal connection of the vehicle between the V2V message service apparatus 1100 and the V2V message server 1200, and it determines an occurrence of internal communication problems (e.g., network error, navigation system termination, etc.) of the V2V message service apparatus 1100 included in the vehicle. In this case, the off-normal vehicle determination unit 1216 transmits information on the vehicle having the internal communication problem to the traffic analysis apparatus 1300 to exclude that vehicle from the traffic information statistics. In addition, the off-normal vehicle determination unit 1216 has the vehicle having the internal communication problem unsubscribe through the subscription processing unit 1212.

The off-normal vehicle notification unit (1218) registers a particular road link in which the off-normal vehicle exists as an off-normal vehicle dwell segment, and determines a notification of off-normal segment message for the off-normal vehicle dwell segment.

The off-normal vehicle notification unit 1218 is responsive to a confirmation of a new vehicle entering the off-normal vehicle dwell segment and requesting a subscription through the subscription processing unit 1212 for transmitting the off-normal segment message to the new vehicle. After transmitting the off-normal segment message to the new vehicle, the off-normal vehicle notification unit 1218 allows a subscription of the new vehicle to be processed in the subscription processing unit 1213.

Meanwhile, the off-normal vehicle notification unit 1218 is described as transmitting an off-normal segment message to only the new vehicle entering the off-normal vehicle dwell segment, but it is not necessarily limited thereto, and the off-normal vehicle notification unit 1218 may transmit the off-normal segment message to those V2V message service apparatuses 1200 in all vehicles traveling in the off-normal vehicle dwell segment.

In addition, the off-normal vehicle notification unit 1218 may transmit a message to all vehicles in the entire subscriber groups belonging to a preset message propagation range from an off-normal vehicle dwell segment. Here, the message propagation range refers to a range in which a trailing vehicle exists possibly under the influence of the occurrence of an off-normal vehicle. The message propagation range may be preset by the V2V message server 1300 in consideration of an event occurrence time, a road link characteristic (e.g., a high-speed driving segment), a weather condition, or other factors.

The communication unit 1230 provides a communication function between the V2V message service apparatus 1100 and the V2V message server 1200. In addition, the communication unit 1230 provides a communication function between the V2V message server 1200 and the traffic analysis apparatus 1300.

The communication unit 1230 according to the present embodiment also includes various software components for processing transmit and receive messages.

Figure 12B:
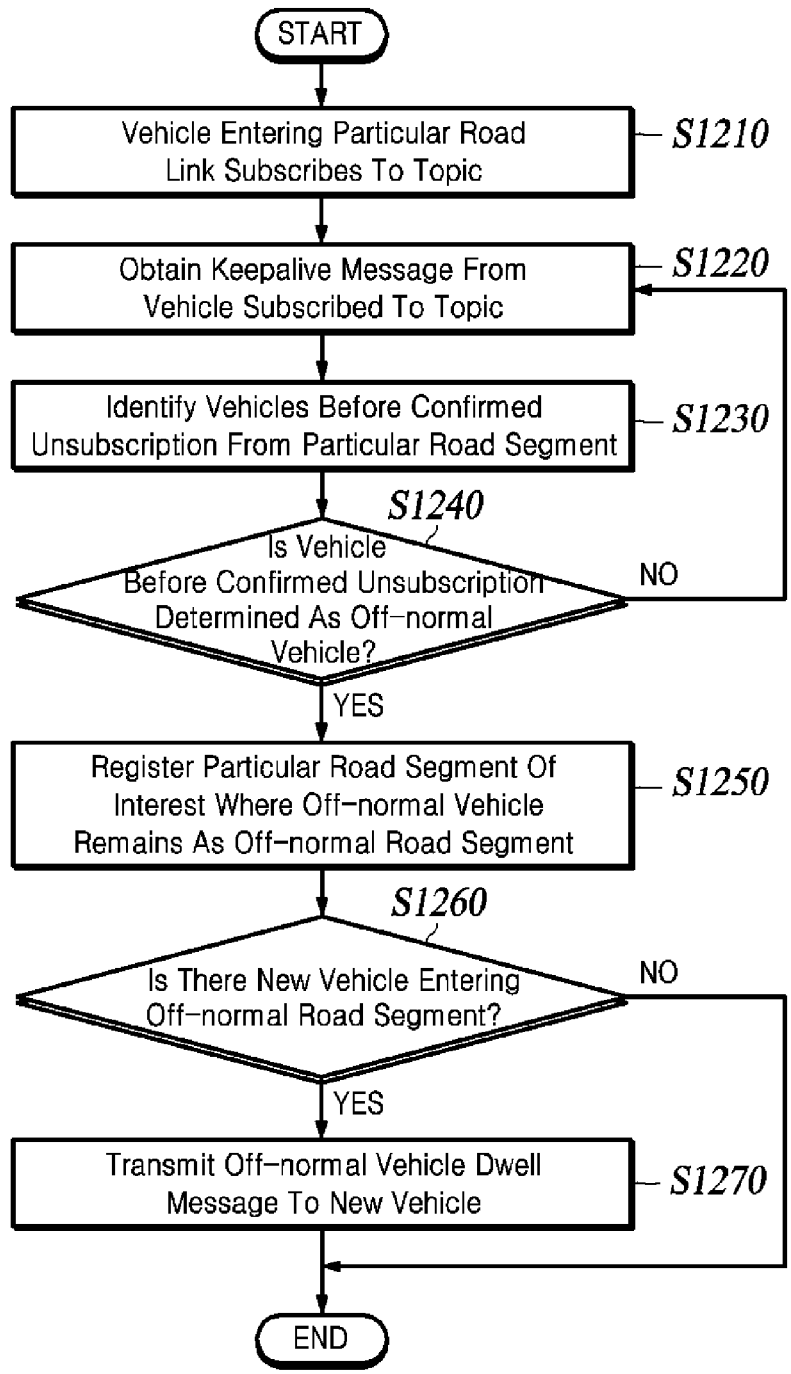
FIG. 12B is a flowchart of a method of detecting an off-normal vehicle according to yet another aspect of the present disclosure.

FIG. 12B is a flowchart of a method of detecting an off-normal vehicle according to yet another aspect of the present disclosure.

As shown in FIG. 12B, the V2V message server 1200 processes a subscription of a vehicle entering a particular road link for a topic of a particular road segment according to a subscription request of that vehicle (S1210).

The V2V message server 1200 obtains a keepalive message from the vehicle subscribed for the topic (S1220). In this case, the V2V message server 1200 determines a normal connection state with the vehicle subscribed for the topic strictly provided that the keepalive message is received within a preset keepalive time.

The V2V message server 1200 is responsive to a confirmation that the vehicle which entered a particular road link remains in the particular road link at or after a preset vehicle passing time (S1230) for determining whether the vehicle is off-normal based on the vehicle's connection state or on whether or not the vehicle has unsubscribed (S1240).

Upon correctly receiving the keepalive message from the vehicle before the confirmed unsubscription, the V2V message server 1200 determines normal connection of the vehicle with the V2V message server 1200 and determines that the same vehicle is off-normal and immovable.

The V2V message server 1200 registers a particular road link in which the off-normal vehicle exists based on information on the determined off-normal vehicle as an off-normal vehicle dwell segment (S1250).

In Step S1260, The V2V message server 1200 is responsive to a new vehicle entering the off-normal vehicle dwell segment (S1260) for transmitting an off-normal segment message to the new vehicle (S1270). After transmitting the off-normal segment message to the new vehicle, the V2V message server 1200 processes a subscription of the new vehicle.

In addition, responsive to at least one vehicle in the entire subscriber groups belonging to a preset message propagation range from the off-normal vehicle dwell segment, the V2V message server 1200 may transmit the off-normal segment message to that vehicle.

Figure 13:
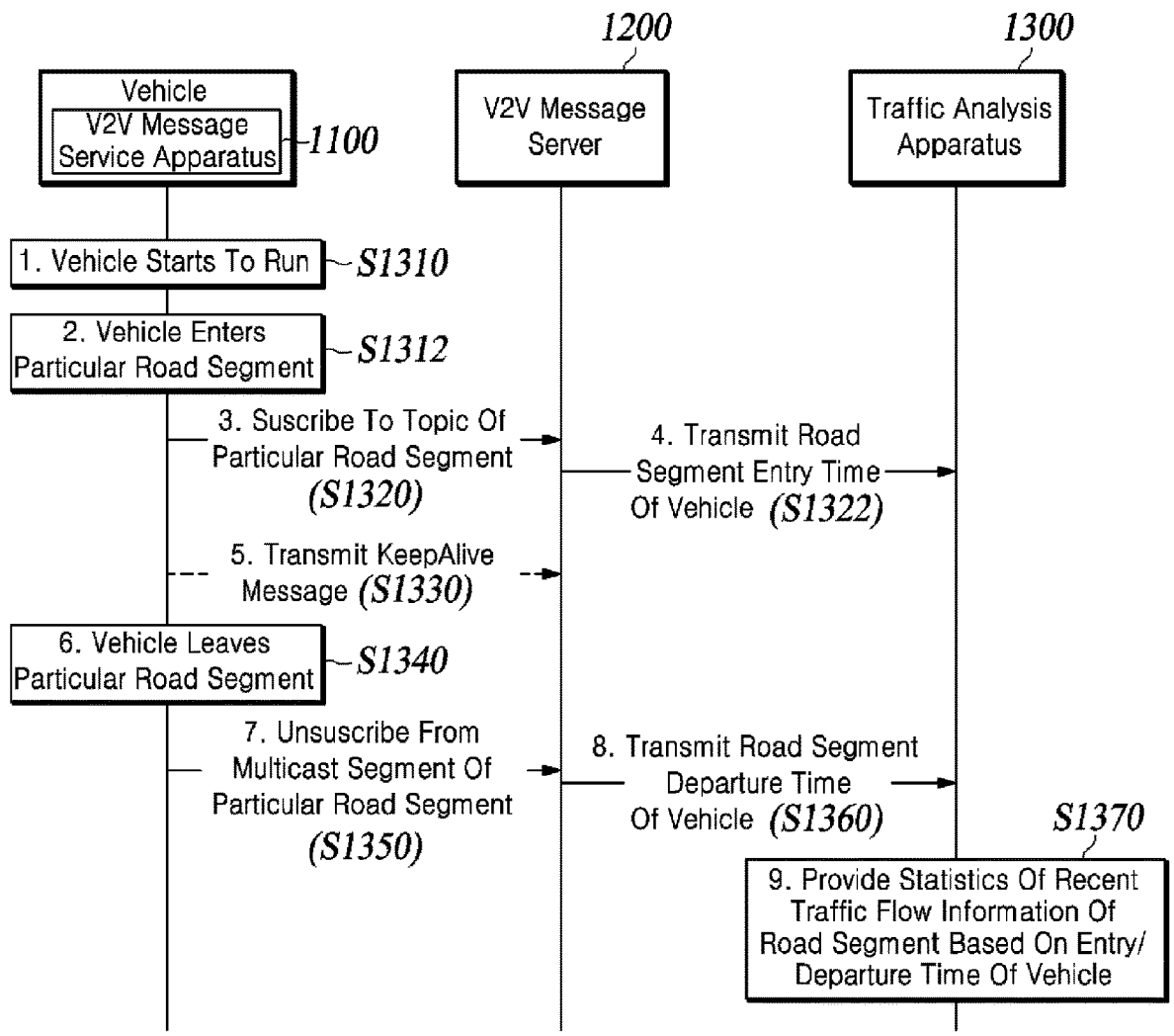
FIG. 13 is a flowchart of a service method of an off-normal segment message according to yet another aspect of the present disclosure.

FIG. 13 is a flowchart of a service method of an off-normal segment message according to yet another aspect of the present disclosure.

As shown in FIG. 13, a vehicle including the V2V message service apparatus 1100 starts to run (S1310).

When the vehicle enters a particular road link (Step S1312), the V2V message service apparatus 1100 transmits a subscription request to the V2V message server 1200 to process a subscription for a multicast section of a particular road segment (S1320). Specifically, a vehicle passing through a particular road segment undergoes a subscription process for a topic of a particular road segment in response to a subscription request. Here, the topic is set to a particular road link. The road link may be a single road segment exhibiting a traffic flow in one direction, and each road link is provided with an identifier.

The V2V message server 1200 transmits an entry time of the vehicle entering the particular road link to the traffic analysis apparatus 1300 (S1322). The traffic analysis apparatus 1300 may predict the time for the vehicle to leave the particular road link based on the entry time and traffic flow information of the particular road link.

The V2V message service apparatus 1100 transmits a keepalive message to the V2V message server 1300 every predetermined keepalive time window or every predetermined distance while subscribing for a topic of a particular road link (S1330). The V2V message server 1200 may check a connection with the V2V message service apparatus 1100 by obtaining a keepalive message.

When the V2V message service apparatus 1100 fails to transmit a keepalive message in the keepalive time, the V2V message server 1300 may process unsubscription of that vehicle from the topic of the particular road link.

On the other hand, when the vehicle leaves the particular road link (S1340), the V2V message service apparatus 1100 transmits an unsubscription request to the V2V message server 1200 to perform an unsubscription from the multicast section of the particular road link (S1350).

The V2V message server 1200 transmits the departure time of the vehicle leaving the particular road link to the traffic analysis apparatus 1300 (S1360).

The traffic analysis apparatus 1300 may provide statistics of traffic flow information of the relevant road link based on the entry time and the departure time of the vehicle to and from the particular road link (S1370). Here, the period for generating statistics of traffic flow information may be changed according to a setting, and various statistics generation methods may be employed to statistically process traffic flow information.

In addition, the traffic analysis apparatus 1300 may interwork with the V2V message server 1200 for securing information on the running vehicles distributed on the road, speeds of the running vehicles entering or leaving road segments, and other data in real time, thereby establishing a database related to traffic flow information.

Figure 14:
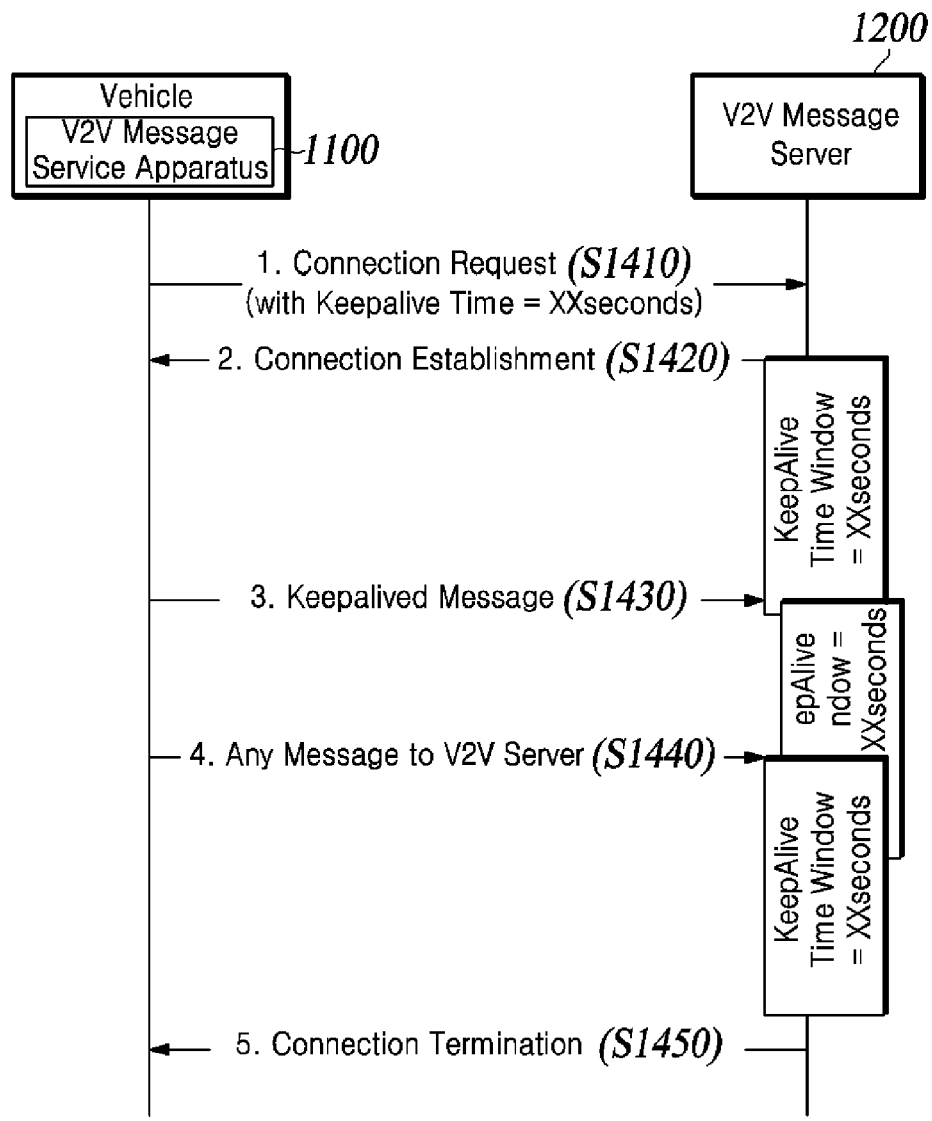
FIG. 14 is a flowchart of an operation of transmitting and receiving a keepalive message according to yet another aspect of the present disclosure.

FIG. 14 is a flowchart of an operation of transmitting and receiving a keepalive message according to yet another aspect of the present disclosure.

FIG. 14 illustrates a detailed process of checking the keepalive state of Step S1330 of FIG. 13. Here, the method of checking the keepalive state may be implemented in various embodiments, and some steps of FIG. 14 may be deleted or changed or a new step may be added.

After entering a particular road segment, the V2V message service apparatus 1100 transmits a connection request signal for connection with the V2V message server 1200 (S1410). The connection request signal may be a subscription request signal for making a subscription for a topic of a particular road link, and it may include a setting value for setting the keepalive time of a keepalive message.

The V2V message server 1200 accepts the subscription request to establish a connection with the V2V message service apparatus 1100 and sets a keepalive time window based on the setting value for setting the keepalive time (S1420). For example, the V2V message server 1300 may set the keepalive time window of the keepalive message to 20 ms based on the request of the V2V message service apparatus 1100.

Upon correctly obtaining the keepalive message within the keepalive time from the V2V message service apparatus 1100 (S1430), the V2V message server 1200 newly sets the keepalive time while being counted, to the keepalive time window. For example, upon receiving the keepalive message while the keepalive time of the keepalive message is counted from 20 seconds down to 10 seconds, the V2V message server 1200 changes the keepalive time back to 20 seconds to start counting.

In another case, upon receiving a predetermined message corresponding to a predefined protocol rather than the keepalive message from the V2V message service apparatus 1100 (S1440), the V2V message server 1200 may newly set the keepalive time while being counted, to the keepalive time window.

When failing to receive the keepalive message within the keepalive time from the V2V message service apparatus 1100, the V2V message server 1200 terminates the connection with the relevant V2V message service apparatus 1100 (S1450).

As shown in FIG. 13, the V2V message server 1200 preferably, but not necessarily, terminates the connection with the V2V message service apparatus 1100 after a predetermined error time (margin) has elapsed, rather than immediately upon failing to receive the keepalive message within the keepalive time.

Figure 15:
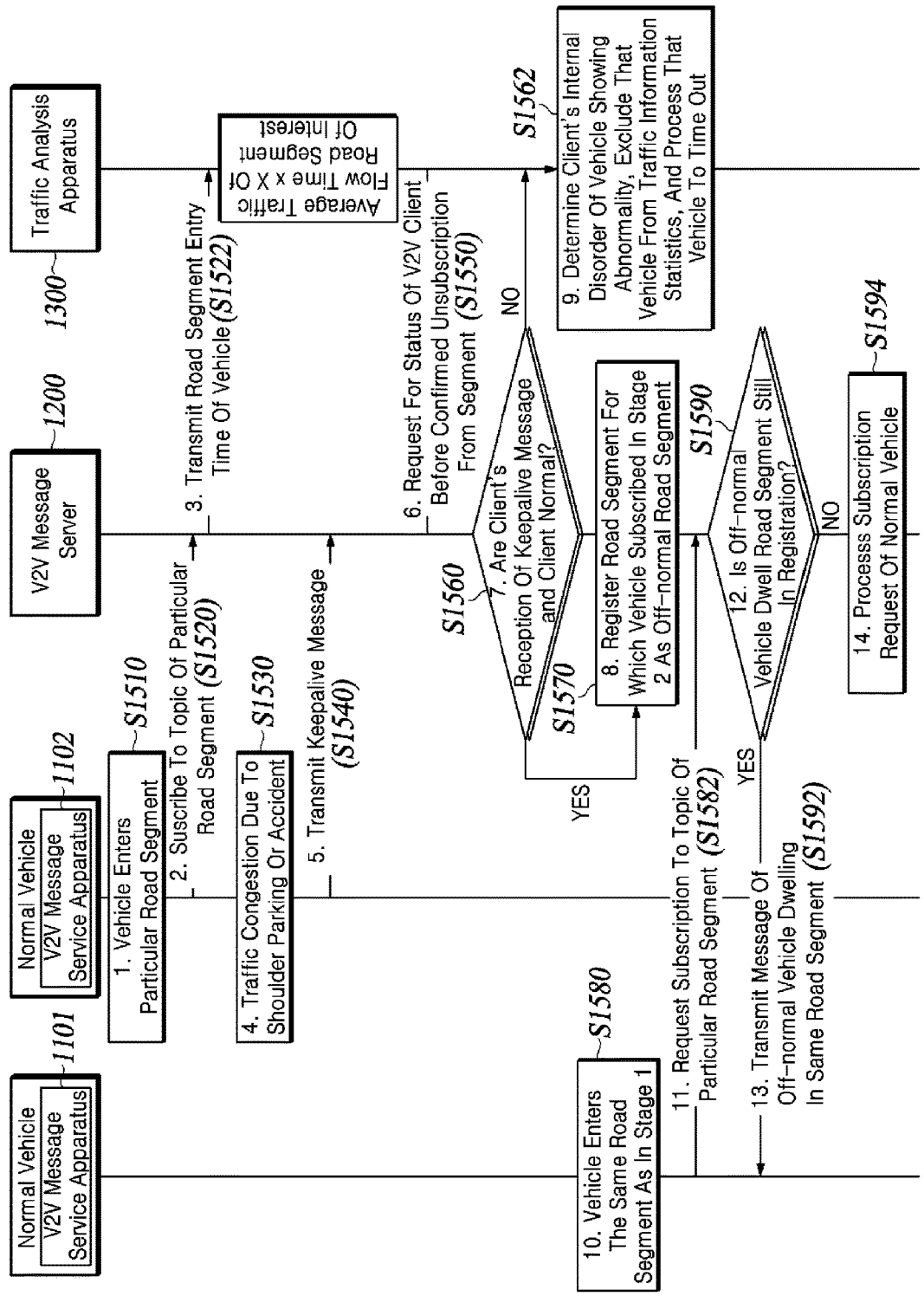
FIG. 15 is a flowchart of a method of detecting an off-normal vehicle according to yet another aspect of the present disclosure.

FIG. 15 is a flowchart of a method of detecting an off-normal vehicle according to yet another aspect of the present disclosure.

In FIG. 15, to describe a scenario for detecting an off-normal vehicle, a vehicle to incur a future off-normal state is defined as a first vehicle (off-normal vehicle), and a trailing vehicle traveling in the same direction as the first vehicle or a neighbor vehicle traveling around the first vehicle is defined as a second vehicle (normal vehicle). Here, it is assumed that the first vehicle includes a first V2V message service apparatus (first client) 1102, and the second vehicle includes a second V2V message service apparatus (second client) 1101.

When the first vehicle enters a particular road segment (S1510), the V2V message server 1200 processes a subscription of the first vehicle for the corresponding topic based on a topic subscription request of the particular road segment obtained from the first vehicle (S1520).

The V2V message server 1200 transmits an entry time of the first vehicle to the traffic analysis apparatus 1300 (Step S1522), and the traffic analysis apparatus 1300 starts counting a predetermined vehicle passing time. Here, the vehicle passing time refers to a time calculated by multiplying an average traffic flow time value calculated from traffic flow information such as an entry time/departure time of vehicles normally passing through the relevant segment by a predetermined multiplier (X).

The first vehicle incurs an off-normal condition stopping it from moving after subscribing for the topic of the particular road segment (S1530). Here, the first vehicle may be difficult to move for various reasons such as parking at shoulder lane, accident occurred, congestion due to an accident of other vehicles, etc. In this case, the first vehicle may defined as being in an off-normal condition.

Even at the occurrence of the off-normal state, the first vehicle transmits a keepalive message to the V2V message server 1200 according to a preset keepalive time window of the keepalive message (Step S1540). Here, when the first V2V message service apparatus 1102 operates normally, the first vehicle may transmit the keepalive message, and when the first V2V message service apparatus 1102 operates abnormally due to disorder, such as a network error, a navigation system termination, etc., the first vehicle cannot transmit the keepalive message. In Step S1540, the first vehicle may repeat the operation of transmitting the keepalive message according to the keepalive time window.

The traffic analysis apparatus 1300 determines that the first vehicle is not normally unsubscribed from the topic of the particular road segment upon completion of counting the preset vehicle passing time based on the entry time of the first vehicle, and it transmits a request for the state confirmation of the first vehicle to the V2V message server 1200 (S1550).

The V2V message server 1200 checks the vehicle connection state of the first vehicle before the confirmed unsubscription from the topic of the particular road link based on the state confirmation request of the first vehicle (S1560). Here, the vehicle connection state may include whether or not the keepalive message of the first vehicle has been transmitted, the state of the first V2V message service apparatus 1102, and so on.

The V2V message server 1200 is responsive to the vehicle connection state of the first vehicle being off-normal ('NO' of S1560) for determining the occurrence of an internal communication disorder (e.g., network error, navigation system termination, etc.) of the first V2V message service apparatus 1102 included in the first vehicle, and it has the first vehicle excluded from calculating the traffic information statistics by the traffic analysis apparatus 1300 (S1562).

On the other hand, when the vehicle connection state of the first vehicle is in a normal state ('YES' of S1560), the V2V message server 1200 determines that the first vehicle is off-normal and immovable and registers the particular road segment for which the first vehicle subscribed as an off-normal vehicle dwell segment (S1570).

Thereafter, when the second vehicle enters the same segment as that for which the first vehicle subscribed (S1580), the V2V message server 1200 obtains a subscription request for the topic of the particular road segment from the second vehicle (S1582).

The V2V message server 1200 checks whether the particular road segment is still registered as the off-normal vehicle dwell segment (S1590), and if so registered, it transmits an off-normal segment message to the second vehicle (S1592).

On the other hand, in Step S1590, the V2V message server 1200 may release the registration of an off-normal vehicle dwell segment when counting the predetermined vehicle passing time is repeated predetermined multiple times or at a separate ratio, or when the first vehicle unsubscribed from a particular road segment due to its departure therefrom, e.g., when it parked at shoulder lane and then left the particular road.

The V2V message server 1200 operates based on a topic subscription request of the second vehicle after the transmission of the off-normal segment message (S1582) to process a normal subscription of the second vehicle with the particular road segment set as the topic (S1594).

Although the steps in FIG. 5, FIGS. 7 to 9, FIG. 11B, and FIGS. 12B to 15 are described to be sequentially performed, they merely instantiate the technical idea of some embodiments of the present disclosure. Therefore, a person having ordinary skill in the pertinent art could appreciate that various modifications, additions, and substitutions are possible by changing the sequences described in FIG. 5, FIGS. 7 to 9, FIG. 11B, and FIGS. 12B to 15 or by performing two or more of the steps in parallel, without departing from the gist and the nature of the embodiments of the present disclosure, and hence the steps in FIG. 5, FIGS. 7 to 9, FIG. 11B, and FIGS. 12B to 15 are not limited to the illustrated chronological sequences.

The V2V message service method according to some embodiments described in FIG. 5, FIGS. 7 to 9, FIG. 11B, and FIGS. 12B to 15 can be implemented as a software application (or program) and recorded on a recording medium readable by a terminal device (or computer). The computer-readable or terminal-readable recording medium on which the software application (or program) for implementing the V2V message service method according to some embodiments can be recorded includes any type of recording device on which data that can be read by a computing system are recordable.

Although exemplary embodiments of the present disclosure have been described for illustrative purposes, those skilled in the art will appreciate that various modifications, additions and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A method of operating a vehicle-to-vehicle (V2V) message service apparatus in a V2V communication system, the method comprising:
    when a first vehicle equipped with the V2V message service apparatus enters a particular road link, subscribing the first vehicle to a V2V message server with the particular road link as a topic;
    receiving an event message including an event-situated road link as a topic from the V2V message server;
    determining whether to issue an alarm corresponding to the event message based on a preceding and trailing relationship between the first vehicle and a second vehicle that published the event message;
    determining whether the first vehicle leaves the particular road link; and unsubscribing the first vehicle from the V2V message server for the particular road link when the first vehicle has left the particular road link.

2. The method of claim 1, further comprising:
determining whether identification information of the first vehicle and identification information of the second vehicle are identical, wherein the identification information of the second vehicle is included in the event message,
wherein the determining of whether to issue the alarm is performed when the identification information of the first vehicle and the identification information of the second vehicle are different.

3. The method of claim 1,
when the event-situated road link and the particular road link are different,
wherein the receiving of the event message is performed when a location of the first vehicle belongs to a preset message propagation range from a location of the second vehicle, and
wherein the determining of whether to issue the alarm comprises issuing the alarm corresponding to the event message without determining a preceding and trailing relationship between the first vehicle and the second vehicle.

4. The method of claim 3, wherein the receiving of the event message comprises:
receiving a duplicated event message of the second vehicle, which is made by the V2V message server.

5. The method of claim 1, further comprising:
checking whether an event occurs against the first vehicle; and
publishing to the V2V message server an event message including the particular road link as a topic when the event occurs against the first vehicle.

6. The method of claim 1, wherein the determining of whether to issue the alarm comprises:
comparing a driving distance of the first vehicle with a driving distance of the second vehicle for the particular road link, wherein the driving distance of the second vehicle is included in the event message;
determining one of the first vehicle and the second vehicle, which has a longer driving distance for the particular road link, to be a preceding vehicle; and
issuing the alarm corresponding to the event message when the second vehicle is determined to be the preceding vehicle.

7. A non-transitory computer readable medium storing a computer program including computer-executable instructions for causing, when executed in a computer, the computer to perform a method of operating a vehicle-to-vehicle (V2V) message service apparatus in a V2V communication system, wherein the method comprises:
when a first vehicle equipped with the V2V message service apparatus enters a particular road link, subscribing the first vehicle to a V2V message server with the particular road link as a topic;
receiving an event message including an event-situated road link as a topic from the V2V message server;
determining whether to issue an alarm corresponding to the event message based on a preceding and trailing relationship between the first vehicle and a second vehicle that published the event message;
determining whether the first vehicle leaves the particular road link; and
unsubscribing the first vehicle from the V2V message server for the particular road link when the first vehicle has left the particular road link.

8. A vehicle-to-vehicle (V2V) message service apparatus, comprising:
a communication unit configured to communicate with a V2V message server; and
a control unit,
wherein the control unit is configured to perform
when a first vehicle equipped with the V2V message service apparatus enters a particular road link, subscribing the first vehicle to the V2V message server with the particular road link as a topic;
making a determination of a preceding and trailing relationship between the first vehicle and a second vehicle that published an event message including an event-situated road link as a topic, and determining, based on the determination made on the preceding and trailing relationship, whether to issue an alarm in the first vehicle, corresponding to the event message received from the V2V message server via the communication unit;
determining whether the first vehicle leaves the particular road link; and
unsubscribing the first vehicle from the V2V message server for the particular road link when the first vehicle has left the particular road link.

9. The V2V message service apparatus of claim 8, further performing:
determining whether identification information of the first vehicle and identification information of the second vehicle are identical, wherein the identification information of the second vehicle is included in the event message received,
wherein the determining of whether to issue the alarm is performed when the identification information of the first vehicle and the identification information of the second vehicle are different.

10. The V2V message service apparatus of claim 8,
when the event-situated road link and the particular road link are different,
wherein the event message is received from the V2V message server via the communication unit when a location of the first vehicle belongs to a preset message propagation range from a location of the second vehicle, and
wherein the determining of whether to issue the alarm comprises issuing the alarm corresponding to the event message without determining a preceding and trailing relationship between the first vehicle and the second vehicle.

11. The V2V message service apparatus of claim 10, wherein the event message is duplicated by the V2V message server.

12. A method of operating a vehicle-to-vehicle (V2V) message server in a V2V communication system to detect an off-normal vehicle, the method comprising:
processing a subscription of a vehicle to a topic of a particular road link when the vehicle enters the particular road link;
upon determining that the vehicle remains in the particular road link at or after a preset vehicle passing time, determining whether the vehicle is off-normal based on whether or not a keepalive message of the vehicle is obtained; and
issuing an off-normal vehicle notification when the vehicle is off-normal, the issuing comprises registering the particular road link where the vehicle remains as an off-normal vehicle dwell segment and determining a notification of an off-normal segment message for the off-normal vehicle dwell segment; and processing an unsubscription of the vehicle from the topic of the particular road link when the vehicle has left the particular road link.

13. The method of claim 12, further comprising:

obtaining the keepalive message every predetermined period from the vehicle subscribed to the topic, wherein the determining of whether the vehicle is off-normal comprises checking whether the vehicle before a confirmed unsubscription from the topic of the particular road link is off-normal.

14. The method of claim 13, wherein the determining of whether the vehicle is off-normal comprises:

determining a normal connection state of the vehicle before the confirmed unsubscription and determining the vehicle to be the off-normal vehicle, when the keepalive message of the vehicle is received every predetermined keepalive time window.

15. The method of claim 13, wherein the determining of whether the vehicle is off-normal comprises:

determining an off-normal connection state of the vehicle before the confirmed unsubscription and determining that a communication problem has occurred against the vehicle to exclude the vehicle from being determined as the off-normal vehicle, when the keepalive message of the vehicle is not received every predetermined keepalive time window.

16. The method of claim 15, wherein the determining of whether the vehicle is off-normal comprises:

excluding the vehicle for being determined as having the communication problem in calculating traffic information statistics and performing a controlled unsubscription of the vehicle from the topic.

17. The method of claim 13, wherein the issuing of the off-normal vehicle notification comprises:

when a new vehicle enters the off-normal vehicle dwell segment and requests a subscription to the topic, transmitting the off-normal segment message to the new vehicle and allowing the new vehicle to subscribe to the topic.

18. A vehicle-to-vehicle (V2V) message server, comprising:

a communication unit configured to communicate with at least one vehicle equipped with a V2V message service apparatus;

a subscription processing unit configured to processing a subscription of a vehicle to a topic of a particular road link when the vehicle enters the particular road link;

an off-normal vehicle determination unit configured to be responsive to a determination that the vehicle remains in the particular road link at or after a preset vehicle passing time for checking whether the vehicle is off-normal based on whether or not a keepalive message of the vehicle is obtained;

an off-normal vehicle notification unit configured to issue an off-normal vehicle notification when the vehicle is off-normal through registering the particular road link where the vehicle remains as an off-normal vehicle dwell segment and determining a notification of an off-normal segment message for the off-normal vehicle dwell segment;

an unsubscription processing unit configured to process an unsubscription of the vehicle from the topic of the particular road link when the vehicle has left the particular road link.

19. The V2V message server of claim 18, further comprising:

a keepalive state processing unit configured to obtain the keepalive message every predetermined period from the vehicle subscribed to the topic, wherein the off-normal vehicle determination unit is configured to check whether the vehicle before a confirmed unsubscription from the topic of the particular road link is off-normal.

* * * * *